United States Patent [19]

Shimada et al.

[11] Patent Number: 4,490,077

[45] Date of Patent: Dec. 25, 1984

[54] APPARATUS FOR CONTINUOUSLY MEASURING FLOW RATE OF FINE MATERIAL FLOWING THROUGH TRANSPORT PIPE

[75] Inventors: Katsuhiko Shimada; Koji Nakayama; Tatsuo Sato; Kazuo Saito, all of Yokohama, Japan

[73] Assignees: Nippon Kokan Kabushiki Kaisha; Sankyo Dengyo Kabushiki Kaisha, both of Tokyo, Japan

[21] Appl. No.: 395,969

[22] Filed: Jul. 7, 1982

[30] Foreign Application Priority Data

Jul. 28, 1981 [JP] Japan .................. 56-111053[U]
Jul. 28, 1981 [JP] Japan .................. 56-111054[U]
Oct. 13, 1981 [JP] Japan .................. 56-162022
Nov. 4, 1981 [JP] Japan .................. 56-175743

[51] Int. Cl.$^3$ ............................................ B65G 53/66
[52] U.S. Cl. ............................ 406/14; 406/124; 406/146
[58] Field of Search ............. 406/14, 19, 29, 30, 406/32, 25, 34, 124–126, 146

[56] References Cited

U.S. PATENT DOCUMENTS

| 3,230,016 | 1/1966 | Gilbert et al. | 406/124 |
| 3,479,093 | 11/1969 | Hale | 406/124 X |
| 3,636,763 | 1/1972 | Beck . | |
| 4,082,513 | 4/1978 | Andon et al. | 406/124 X |

FOREIGN PATENT DOCUMENTS

| 2014747 | 10/1970 | Fed. Rep. of Germany . |
| 1798182 | 9/1971 | Fed. Rep. of Germany . |
| 2618064 | 11/1977 | Fed. Rep. of Germany . |
| 2925510 | 1/1981 | Fed. Rep. of Germany . |
| 2944974 | 5/1981 | Fed. Rep. of Germany . |
| 2951873 | 7/1981 | Fed. Rep. of Germany . |
| 1337904 | 8/1963 | France . |

*Primary Examiner*—Jeffrey V. Nase
*Assistant Examiner*—L. E. Williams
*Attorney, Agent, or Firm*—Frishauf, Holtz, Goodman and Woodward

[57] ABSTRACT

An apparatus for continuously measuring the flow rate of a fine material flowing through a transport pipe, which comprises: an integrator for integrating calculated values of the flow rate of a fine material flowing through a transport pipe, obtained by a flow rate calculating means; a correction controller, said correction controller being adapted to calculate the total weight of the fine material fed during a prescribed period of time while the fine material in a hopper is only decreasing in amount from said hopper into said transport pipe, on the basis of a measured value of the weight of the fine material in said hopper, and to actuate said integrator during said prescribed period of time; a divider for calculating the correction coefficient "k", i.e., the ratio (W/S) of a calculated value (W) obtained by said correction controller to an integrated value (S) obtained by said integrator; and a multiplier for calculating a corrected value of the flow rate of the fine material flowing through said transport pipe, by multiplying said calculated value obtained by said flow rate calculating means with said correction coefficient "k".

17 Claims, 15 Drawing Figures

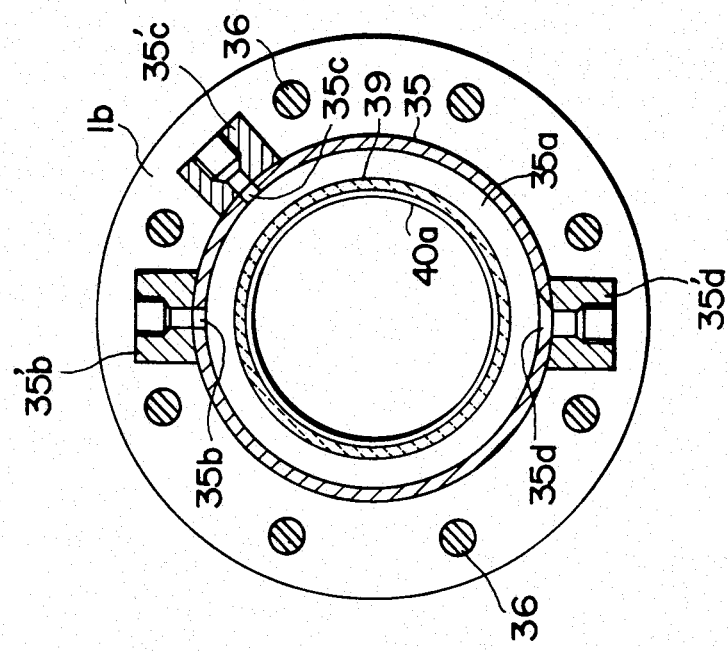
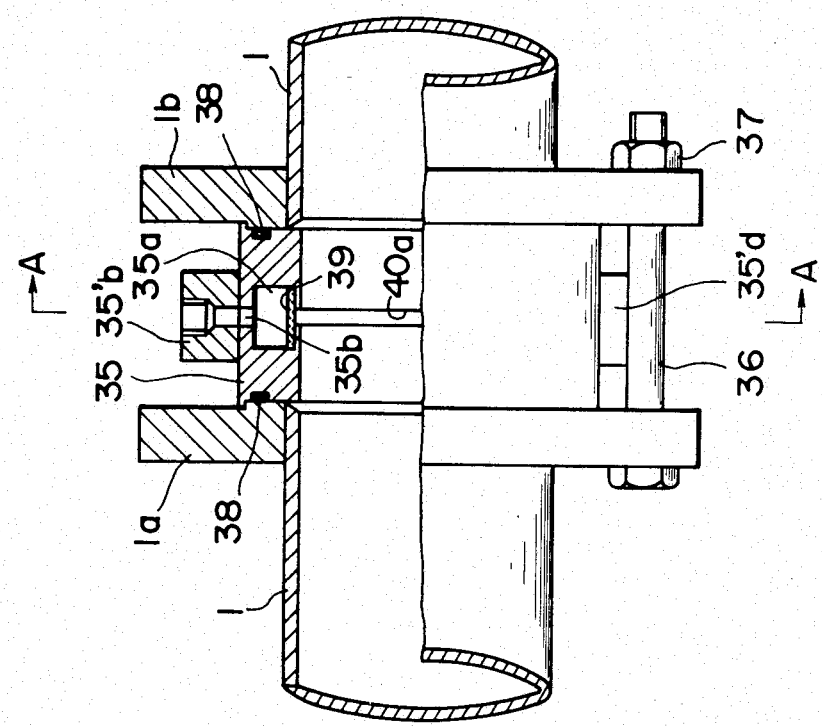

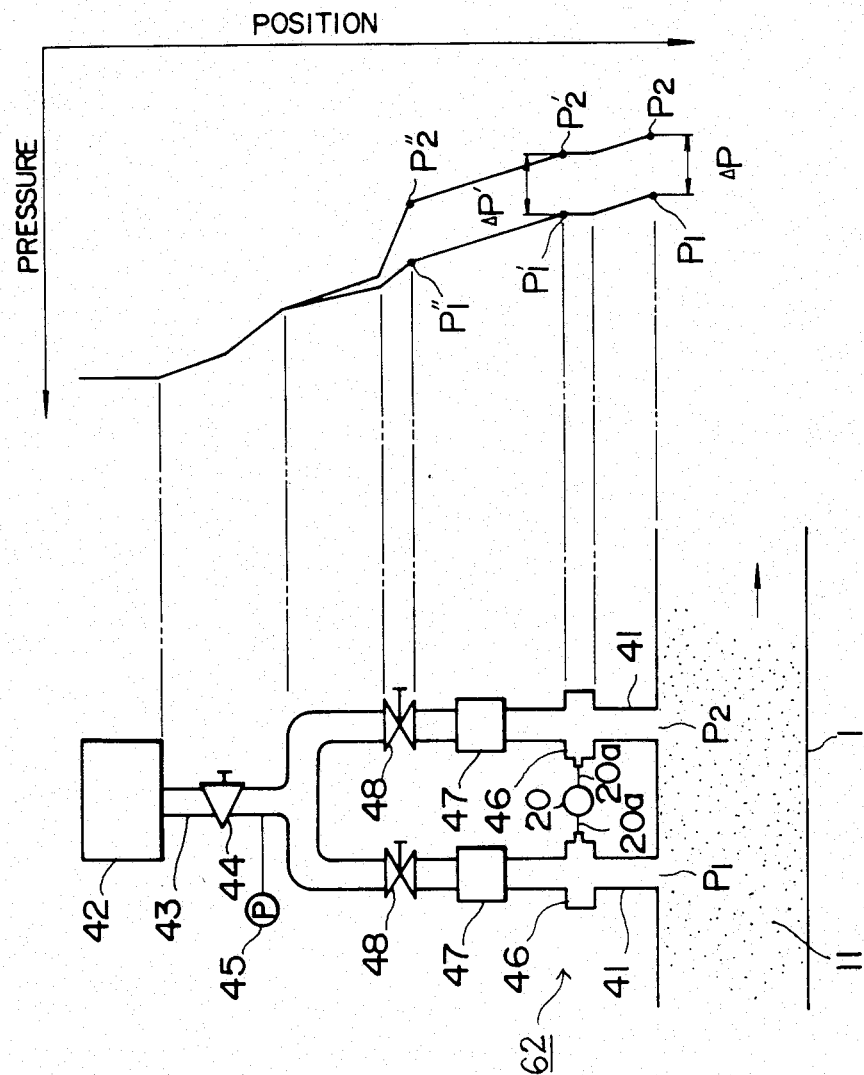

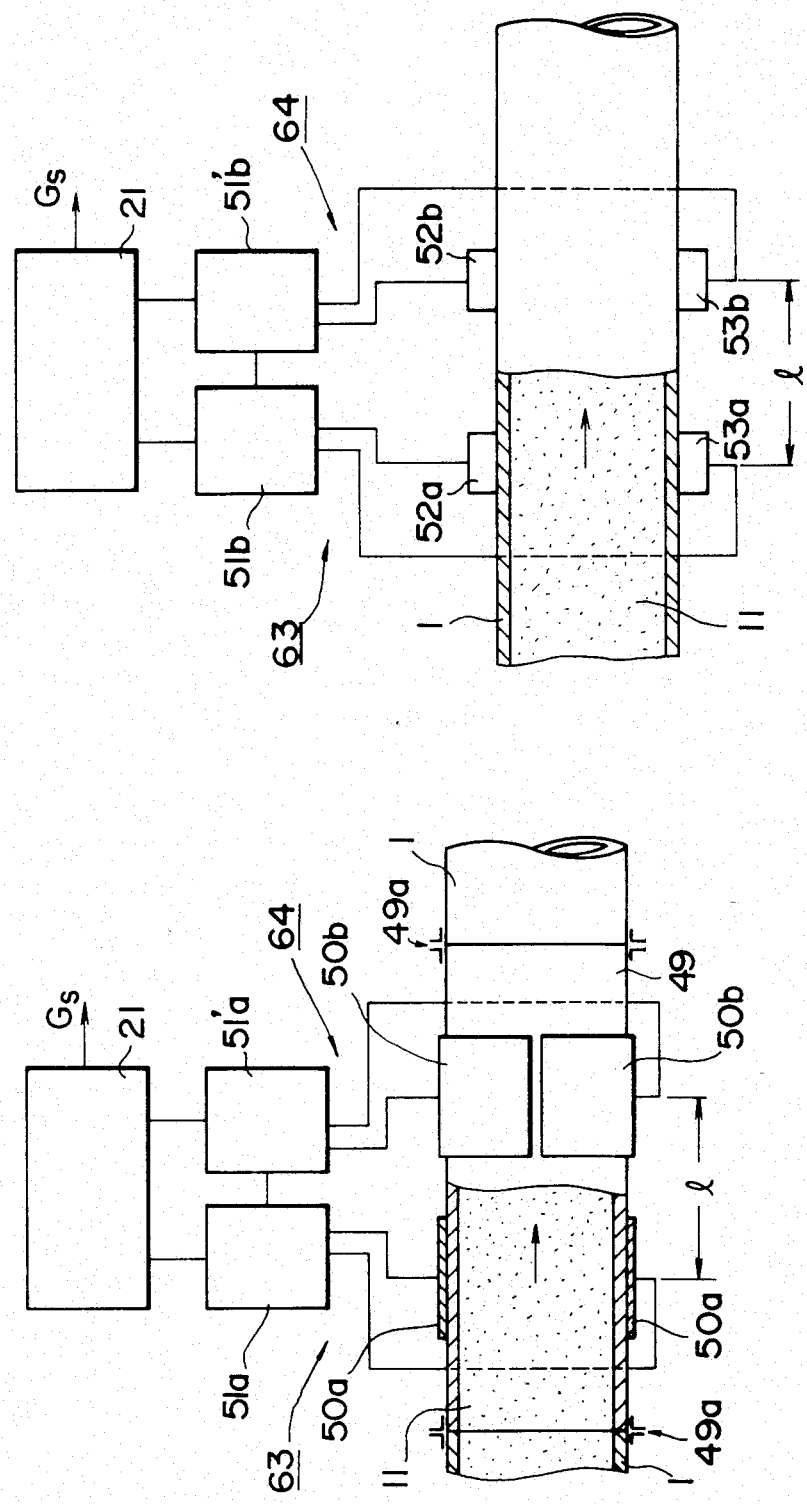

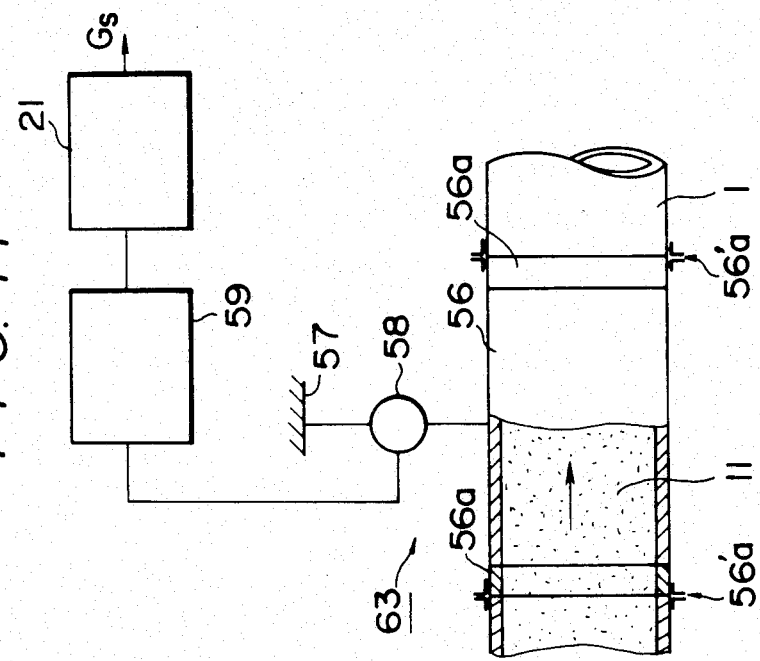
F I G. 14
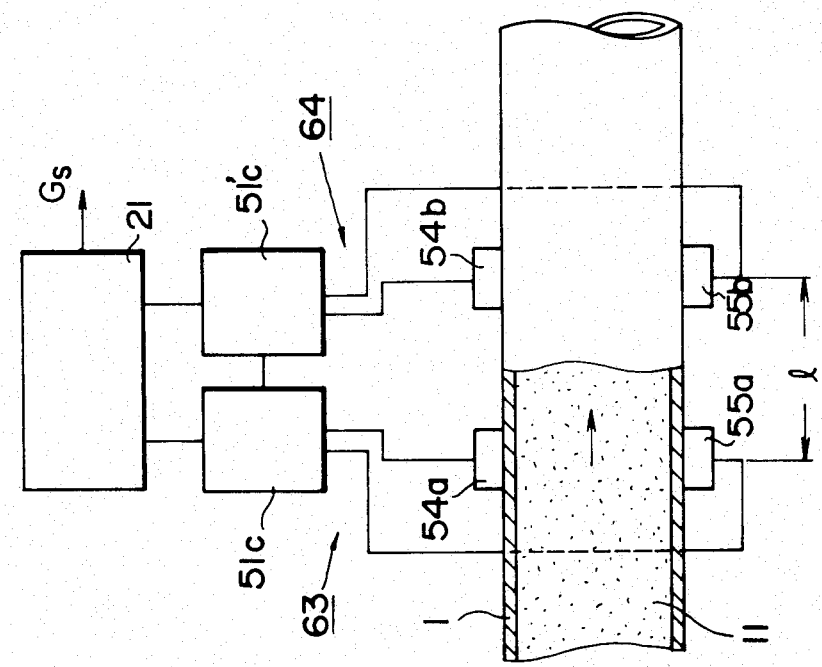
F I G. 13

APPARATUS FOR CONTINUOUSLY MEASURING FLOW RATE OF FINE MATERIAL FLOWING THROUGH TRANSPORT PIPE

FIELD OF THE INVENTION

The present invention relates to an apparatus for continuously measuring the flow rate of a fine material, which permits very accurate measurement of the flow rate of the fine material flowing through a transport pipe.

BACKGROUND OF THE INVENTION

Known fine materials include pulverized coal, silica sand, lime powder, plastic pellets and cereals. Pulverized coal is supplied as a fuel into for example a blast furnace or a firing furnace for manufacturing lime. Therefore, operation of a blast furnace or a firing furnace requires measurement of the flow rate of the pulverized coal supplied into the blast furnace or the firing furnace for manufacturing lime.

As a method for continuously transporting the fine material such as the pulverized coal from a temporary storage facility such as a hopper to a destination facility such as a firing furnace, the following method is known, which comprises:

connecting an end of a transport pipe to a carrier gas source;

connecting the other end of said transport pipe to a destination facility;

blowing a carrier gas from said carrier gas source into said transport pipe so that the carrier gas flows from an end of the transport pipe toward the other end thereof;

continuously supplying a fine material contained in a temporary storage facility, in the middle of said transport pipe, into said transport pipe through which said carrier gas flows; and, transporting said fine material supplied into said transport pipe to the destination facility by said carrier gas flowing through said transport pipe.

As one of the apparatuses for measuring the flow rate of the fine material flowing through the transport pipe as mentioned above, the following apparatus is known.

As shown in FIG. 1, an end of a transport pipe 1 is connected with an air source (not shown), and the air is supplied from the air source (not shown) into the transport pipe 1. In this figure, 2 is a hopper. The hopper 2 has a closed structure. The reference numeral 7 represents a service tank. The top of the service tank 7 is open from which a fine material 11 is supplied into the service tank 7 from time to time by an appropriate supply means. The lower exit of the service tank 7 airtightly communicates with the upper entry of the hopper 2 by a first communication pipe 4. A first rotary valve 5 and a first expansion joint 6 are installed in the middle of the first communication pipe 4. In the open stateof the first rotary valve 5, therefore, the fine material 11 contained in the service tank 7 is supplied from the service tank 7 through the first communication pipe 4 into the hopper 2.

The lower exit of the hopper 2 air-tightly communicates with the transport pipe 1 by a second communication pipe 8. A second rotary valve 9 and a second expansion joint 10 are provided in the middle of the second communication pipe 8. The upper portion of the hopper 2 air-tightly communicates with the second communication pipe 8 by an equalizer 12. The pressure in the hopper 2 is kept substantially equal to that in the second communication pipe 8 through the equalizer 12. The fine material 11 contained in the hopper 2 is supplied through the second communication pipe 8 into the transport pipe 1, and transported by the air flowing through the transport pipe 1 to the other end of the transport pipe 1.

In FIG. 1, 3 is a load cell, attached to the hopper 2, for continuously measuring the weight of the fine material 11 contained in the hopper 2. The hopper 2 is supported through the load cell 3 on an appropriate supporting means (not shown).

The fine material 11 is continuously supplied from the hopper 2 through the second communication pipe 8 into the transport pipe 1 by controlling the first rotary valve 5 and the second rotary valve 9 as follows. The second rotary valve 9 is continuously open from the moment of starting transportation of the fine material 11, irrespective of whether the first rotary valve 5 is opened or closed. Therefore, the fine material 11 contained in the hopper 2 is continuously supplied through the second communication pipe 8 into the transport pipe 1. On the other hand,, an output signal of the load cell 3 is amplified by an amplifier 13, and fed into a differentiator 14 and a valve controller 15. In the valve controller 15, an upper limit value and a lower limit value of the weight of the fine material 11 contained in the hopper 2 are set up. Therefore, the fine material 11 contained in the service tank 7 is supplied into the hopper 2 through the first communication pipe 4, by continuously opening the first rotary valve 5 by the valve controller 15, until a measured value obtained by the load cell 3 reaches the upper limit value. Then, at the moment when a measured value obtained by the load cell 3 reaches the upper limit value, the first rotary valve 5 is closed by the valve controller 15. Subsequently, at the moment when a measured value obtained by the load cell 3 reaches the lower limit value, the first rotary valve 5 is opened by the valve controller 15, and the first rotary valve 5 is kept open by the valve controller 15 until a measured value obtained by the load cell 3 reaches the upper limit value.

The output signal of the load cell 3 fed to the differentiator 14 through the amplifier 13 is differentiated by the differentiator 14. An output signal of the differentiator 14 is fed through a differential value holder 16 to an appropriate recording or displaying means (not shown) as a calculating signal of the flow rate of the fine material 11 supplied from the hopper 2 into the transport pipe 1, while the first rotary valve 5 is closed. When the first rotary valve 5 is open, however, the fine material 11 is supplied from the service tank 7 through the first communication pipe 4 into the hopper 2. While the first rotary valve 5 is open, therefore, the load cell 3 cannot measure the weight of the fine material 11 supplied from the hopper 2 through the second communication pipe 8 into the transport pipe 1. Therefore, while the first rotary valve 5 is open, the differential value holder 16 holds a differential value of the output signal which is fed from the differentiator 14 at the time of the start of opening the first rotary valve 5, under the effect of the output signal of the valve controller 15, and feeds a signal having this differential value to an appropriate recording or displaying means (not shown) as a calculating signal of the flow rate of the fine material supplied from the hopper 2 through the second communication pipe 8 into the transport pipe 1.

Therefore, in the apparatus for measuring the flow rate of the fine material 11 flowing through the transport pipe 1 using the load cell 3 as mentioned above, it is impossible to accurately measure the flow rate of the fine material 11 flowing through the transport pipe 1 while the first rotary valve 5 is open.

In view of the above-mentioned inconveniences in the apparatus for measuring the flow rate of the fine material 11 flowing through the transport pipe 1 using the load cell 3, there has been proposed an apparatus for continuously measuring the flow rate of the fine material flowing through the transport pipe substantially identical with (1) an apparatus disclosed in Japanese patent publication No. 2,630/77 dated Jan. 2, 1977; (2) an apparatus disclosed in Japanese patent provisional publication No. 60,215/82 dated Apr. 12, 1982; and, (3) an apparatus disclosed in Japanese patent application No. 46,152/81 dated Mar. 31, 1981 which comprises:

a hopper having a closed structure;

a fine material feeding means, arranged above said hopper, for feeding said hopper with a fine material;

a weighing means for continuously measuring the weight of the fine material contained in said hopper;

a first communication pipe for air-tightly communicating said fine material feeding means and said hopper, said first communication pipe being adapted to introduce the fine material in said fine material feeding means into said hopper;

a first valve, provided in the middle of said first communication pipe, for opening and closing said first communication pipe;

a valve controller for controlling opening and closing of said first valve, said valve controller being adapted to control opening and closing of said first valve in response to a measured value obtained continuously by said weighing means so as to keep the weight of the fine material contained in said hopper within a prescribed range;

a transport pipe arranged below said hopper;

a second communication pipe for air-tightly communicating said hopper and said transport pipe, said second communication pipe being adapted to introduce the fine material in said hopper into said transport pipe;

a second valve, provided in the middle of said second communication pipe, for opening and closing said second communication pipe;

a carrier gas blowing means for blowing a carrier gas for transporting the fine material through said transport pipe into said transport pipe;

an equalizer for air-tightly communicating the top portion of said hopper and said second communication pipe, said equalizer being adapted to equalize the pressure in said hopper with the pressure in said second communication pipe;

a flow rate calculating means for calculating the flow rate of the fine material flowing through said transport pipe, said flow rate calculating means being adapted to continuously calculate the flow rate of the fine material flowing through said transport pipe, on the basis of the following item:

a measured value of the flow rate of the carrier gas flowing through said transport pipe, obtained by a flow rate measuring means, and a measured value of the pressure drop of a two-phase solid-gas flow which is flowing through said transport pipe, obtained by a pressure drop measuring means, said two-phase solid-gas flow comprising the fine material and the carrier gas, said pressure drop being measured between prescribed two points of the transport pipe in the axial direction thereof.

In the above-mentioned apparatus for continuously measuring the flow rate of the fine material flowing through a transport pipe, it is possible to continuously measure the flow rate of the fine material flowing through the transport pipe, without directly using the measured value obtained by the weighing means for measuring the weight of the fine material contained in the hopper. An example of the calculating operations in the above-mentioned apparatus is as follows:

Between two prescribed points of the transport pipe in the axial direction thereof through which the fine material and the carrier gas flow, the pressure drop ratio $\alpha$ and the mixing ratio m are expressed by the following equation:

$$m = k(\alpha - 1)$$

where, $m = G_T/G_a$ $G_s$: flow rate of the fine material flowing through the transport pipe $G_a$: flow rate of the carrier gas flowing through the transport pipe $\alpha = \Delta P_T / \alpha P_a$ $\Delta P_T$: pressure drop of the two-phase solid-gas flow which is flowing through the transport pipe between said prescribed two points of the transport pipe in the axial direction thereof $\Delta P_T = \Delta P_s + \Delta P_a$ $\Delta P_s$: pressure drop caused by a flow of a fine material in the two-phase solid-gas flow which is flowing through the transport pipe, between said prescribed two points of the transport pipe in the axial direction thereof $\Delta P_a$: Pressure drop caused by a flow of the carrier gas in the two-phase solid-gas flow which is flowing through the transport pipe, between said prescribed two points of the transport pipe in the axial direction thereof $\Delta P_a = C_1 \cdot \gamma \cdot U_a^2$ $U_a$: calculated value of flow velocity of the carrier gas flowing through the transport pipe $U_a = C_2 \cdot G_a$ $\gamma$: density of the carrier gas $C_1$: constant dependent on the measured values of the velocity and the density of the carrier gas flowing through the transport pipe in the absence of the fine material $C_2$: constant dependent on the shape of the transport pipe and the conditions of the carrier gas $K$: constant dependent on the shape of the transport pipe and physical properties of the fine material.

By previously determining "K", "$C_1$" and "$C_2$", "$G_s$" can be calculated as follows:

$$G_s = m \cdot G_a$$

However, in the above-mentioned apparatus for continuously measuring the flow rate of the fine material flowing through the transport pipe, the aforementioned constants "K", "$C_1$" and "$C_2$" vary with the wear of the inner surface of the transport pipe with time, and changes with time in particle size, moisture content, specific gravity, temperature and other physical properties of the fine material. This causes an error in the calculations performed for obtaining "$G_s$", thus making it impossible to accurately and continuously xeasure, over a long period of time, the flow rate of the fine material flowing through the transport pipe.

SUMMARY OF THE INVENTION

An object of the present invention is therefore to provide an apparatus for continuously measuring the flow rate of the fine material, which permits very accurate measurement for a long period of time.

In accordance with one of the features of the present invention, in an apparatus for continuously measuring the flow rate of a fine material flowing through a transport pipe, which comprises:

a hopper (2) having a closed structure;

a fine material feeding means (7), arranged above said hopper (2), for feeding said hopper (2) with a fine material (11);

a weighing means (3) for continuously measuring the weight of the fine material (11) contained in said hopper (2);

a first communication pipe (4) for air-tightly communicating said fine material feeding means (7) and said hopper (2), said first communication pipe (4) being adapted to introduce the fine material (11) in said fine material feeding means (7) into said hopper (2);

a first valve (5), provided in said first communication pipe (4), for opening and closing said first communication pipe (4);

a valve controller (15) for controlling opening and closing of said first valve (5), said valve controller (15) being adapted to control opening and closing of said first valve (5) in response to a measured value obtained continuously by said weighing means (3) so as to keep the weight of the fine material (11) contained in said hopper (2) within a prescribed range;

a transport pipe (1) arranged below said hopper (2);

a second communication pipe (8) for air-tightly communicating said hopper (2) and said transport pipe (1), said second communication pipe (8) being adapted to introduce the fine material (11) in said hopper (2) into said transport pipe (1);

a second valve (9), provided in said second communication pipe (8), for opening and closing said second communication pipe (8);

a carrier gas blowing means for blowing a carrier gas into said transport pipe (1) for transporting the fine material (11) through said transport pipe (1);

an equalizer (12) for air-tightly communicating the top portion of said hopper (2) and said second communication pipe (8), said equalizer (12) being adapted to equalize the pressure in said hopper (2) with the pressure in said second communication pipe (8);

a flow rate calculating means (21) for calculating the flow rate of the fine material (11) flowing through said transport pipe (1), said flow rate calculating means (21) being adapted to continuously calculate the flow rate of the fine material (11) flowing through said transport pipe (1), on the basis of one of the following (A) and (B):

(A) a measured value ($G_a$) of the flow rate of the carrier gas flowing through said transport pipe (1) obtained by a flow rate measuring means (17), and a measured value ($\Delta P_T$) of the pressure drop of a two-phase solid-gas flow which is flowing through said transport pipe (1) obtained by a pressure drop measuring means (62), said two-phase solid-gas flow comprising the fine material (11) and the carrier gas, said pressure drop being measured between prescribed two points of the transport pipe (1) in the axial direction thereof, and, (B) a measured value of the density of the fine material (11) flowing through said transport pipe (1) obtained by a density measuring means, a measured value of the flow velocity of the fine material (11) flowing through said transport pipe (1) obtained by a flow velocity measuring means (64), and, the cross-sectional area of said transport pipe (1);

there is provided the improvement characterized by further comprising:

an integrator (25) for integrating calculated values ($G_s$) of the flow rate of the fine material (11) flowing through said transport pipe (1), which are obtained by said flow rate calculating means (21);

a correction controller (22), said correction controller (22) being adapted to calculate the total weight of the fine material (11) which is fed, during a prescribed period of time in the period for which said first communication pipe (4) is closed by said first valve (5), from said hopper (2) into said transport pipe (1), on the basis of said measured value obtained by said weighing means (3) and an output value of said valve controller (15), and, being adapted to actuate said integrator (25) during said prescribed period of time;

a correction commander (28) for informing said correction controller (22) of the starting point of said prescribed period of time;

a divider (27) for calculating a correction coefficient "k", i.e., the ratio (W/S) of a calculated value (W), obtained by said correction controller (22), of the total weight of the fine material (11) which is fed, during said prescribed period of time, from said hopper (2) into said transport pipe (1), to an integral value (S), for said prescribed period of time, obtained by said integrator (25); and, a multiplier (23) for calculating a corrected value ($G'_s$) of the flow rate of the fine material (11) flowing through said transport pipe (1), by multiplying said calculated value ($G_s$) obtained by said flow rate calculating means (21) with said correction coefficient "k".

BRIEF DESCRIPTION OF THE DRAWINGS

FIG. 6 is a sectional view illustrating an embodiment of the annuli each of which is fitted to each of the prescribed two points of the transport pipe in the axial direction thereof, for measuring the pressure drop of the two-phase solid-gas flow comprising the fine material and a carrier air which is flowing through the transport pipe while transporting the fine material;

FIG. 7 is a sectional view cut along line A—A of FIG. 6;

FIG. 10 is a view illustrating a schematic construction of an embodiment of the pressure drop measuring means of the present invention for measuring the pressure drop of the two-phase solid-gas flow comprising the fine material and the carrier air which is flowing through the transport pipe, and showing an example of pressure gradient in this pressure drop measuring means;

FIG. 11 is a schematic constructional view of an embodiment of the arrangement for determining the density and the flow velocity of the fine material flowing through the transport pipe;

FIG. 12 is a schematic constructional view illustrating another embodiment of the arrangement for determining the density and the flow velocity of the fine material flowing through the transport pipe;

FIG. 13 is a schematic constructional view illustrating further another embodiment of the arrangement for determining the density and the flow velocity of the fine material flowing through the transport pipe;

FIG. 14 is a schematic constructional view illustrating an embodiment of the arrangement for determining the density of the fine material flowing through the transport pipe; and, FIG. 15 is a schematic constructional view illustrating an embodiment of the arrangement for determining the flow velocity of the fine material flowing through the transport pipe.

DETAILED DESCRIPTION OF THE PREFERRED EMBODIMENTS

With a view to overcoming the above-mentioned problems involved in the conventional apparatus for measuring the flow rate of the fine material flowing through the transport pipe, we carried out extensive studies. As a result, the following findings were obtained:

(1) In the above-mentioned conventional apparatus for measuring the flow rate of the fine material flowing through the transport pipe, the fine material is not supplied from the fine material feeding means into the hopper while the first communication pipe is closed. Therefore, the total weight of the fine material supplied into the transport pipe during a prescribed period of time while the first communication pipe is closed by the first valve can be calculated on the basis of the measured value obtained by the weighing means. The total weight of the fine material thus obtained is equal to the total weight of the fine material having flown through the transport pipe during said prescribed period of time.

(2) On the other hand, the total weight of the fine material having flown through the transport pipe during said prescribed period of time can be obtained by obtaining an integral value "S" of the calculated values of the flow rate of the fine material flowing through the transport pipe through an integration of said calculated values for said prescribed period of time, said calculated values are obtained by the flow rate calculating means in the above-mentioned conventional apparatus for measuring the flow rate of the fine material flowing through the transport pipe.

(3) As described in (2) above, said integral value "S" for said prescribed period of time contains an error corresponding to the error involved in the calculated value of the flow rate of the fine material flowing through the transport pipe. On the other hand, as described in (1) above, the total weight "W" of the fine material supplied from the hopper into the transport pipe during said prescribed period of time, calculated on the basis of the measured value obtained by the weighing means does not contain an error caused by the wear of the inner surface of the transport pipe with time and changes with time in physical properties of the fine material.

(4) Thus, it is possible to obtain an accurate calculated value of the flow rate of the fine material flowing through the transport pipe, by multiplying the calculated value obtained by the flow rate calculating means with the ratio of said total weight "W" to said integral value "S".

The present invention was developed on the basis of the findings described in (1) to (4) above, and the apparatus of the present invention for continuously measuring the flow rate of the fine material flowing through the transport pipe is described in detail with reference to the drawings in the following paragraphs.

Figure 1:
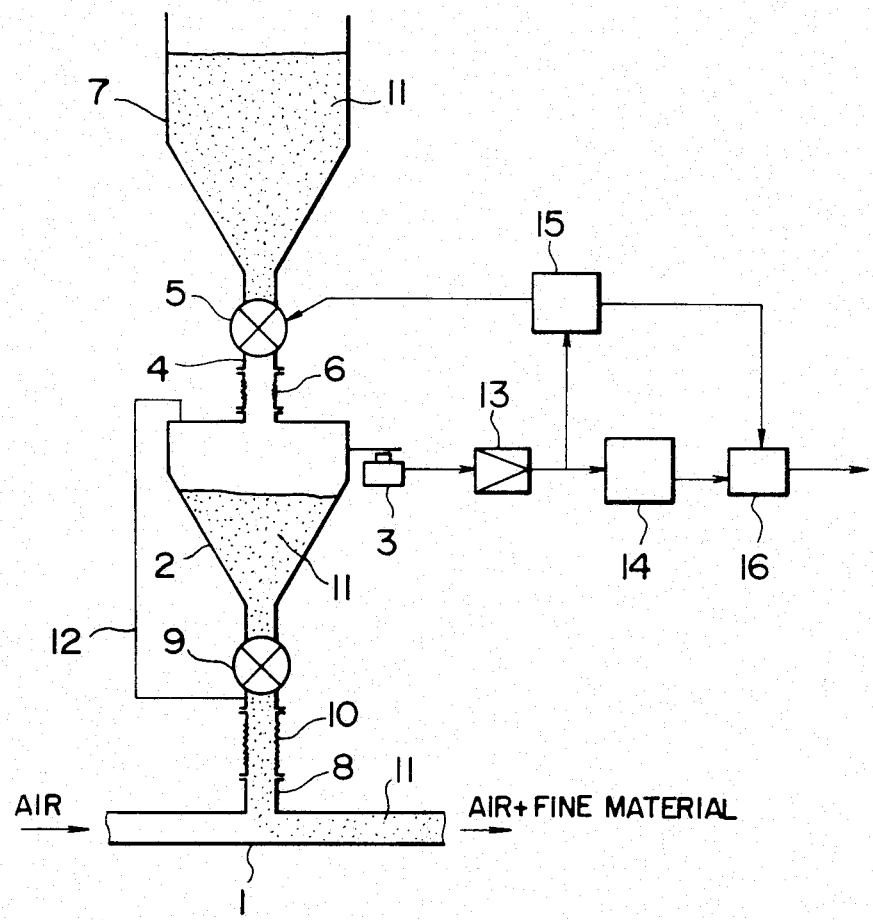
FIG. 1 is a schematic constructional view of a conventional apparatus for measuring the flow rate of the fine material flowing through the transport pipe.
Figure 2:
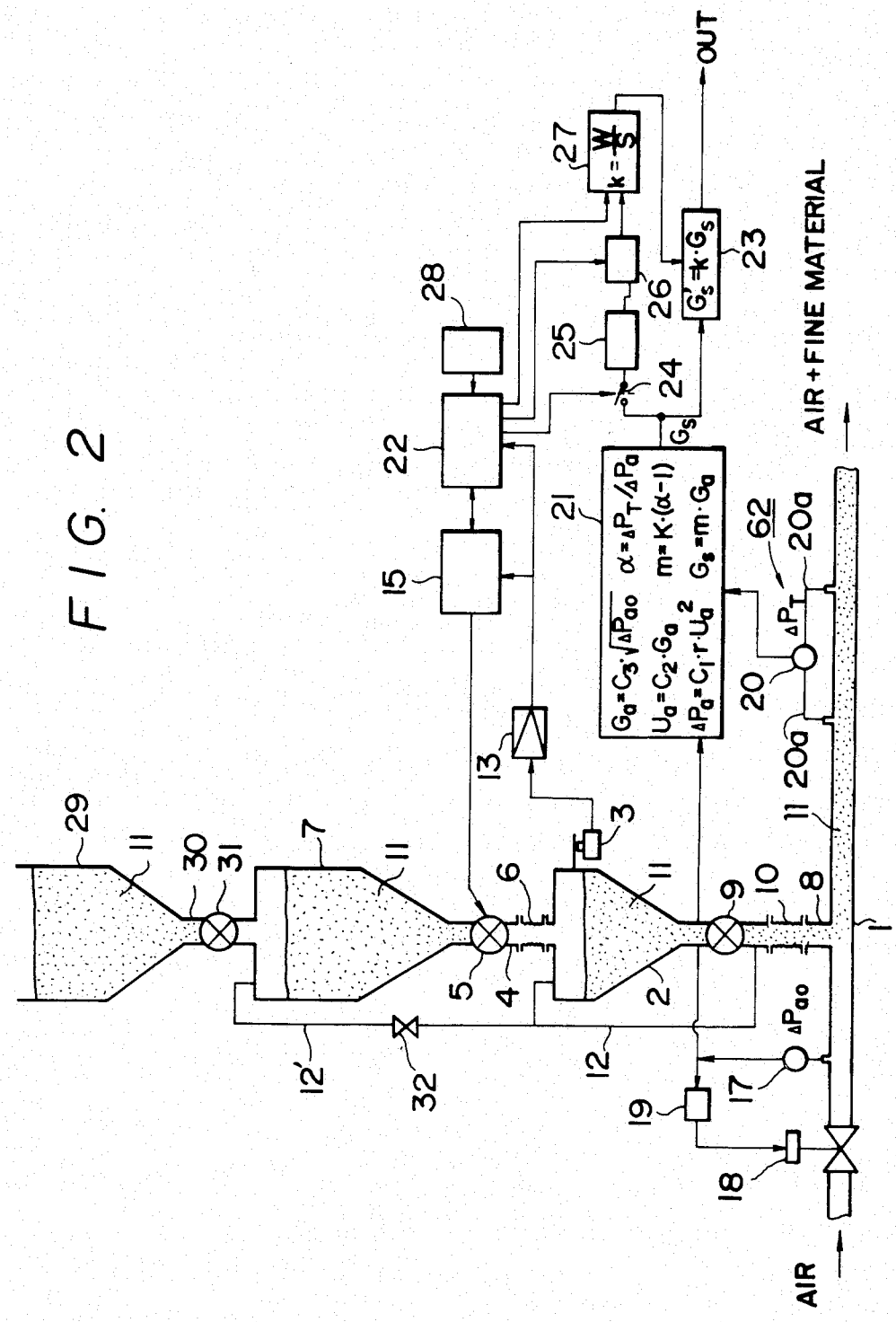
FIG. 2 is a schematic constructional view illustrating an embodiment of the apparatus of the present invention for continuously meansuring the flow rate of the fine material flowing through the transport pipe.

FIG. 2 is a schematic constructional view illustrating an embodiment of the apparatus of the present invention for continuously measuring the flow rate of the fine material flowing through the transport pipe.

As shown in FIG. 2, an air source (not shown) is connected to an end of a transport pipe 1, to feed the transport pipe 1 with the air from the air source (not shown). In this figure, 2 is a hopper. The hopper 2 has a closed structure. 7 is a service tank having a closed structure as a fine material feeding means. 29 is a storage tank arranged above the service tank 7. The top end of the storage tank 29 is open, through which a fine material 11 is supplied from time to time by an appropriate feeding means (not shown). The lower exit of the service tank 7 air-tightly communicates with the upper entry of the hopper 2 by a first communication pipe 4. A first rotary valve 5 as the first valve and a first expansion joint 6 are installed in the middle of the first communication pipe 4.

The lower exit of the hopper 2 air-tightly communicates with the transport pipe 1 by a second communication pipe 8. A second rotary valve 9 as the second valve and a second expansion joint 10 are provided in the middle of the second communication pipe 8. The upper portion of the hopper 2 air-tightly communicates with the second communication pipe 8 by an equalizer 12. The pressure in the hopper 2 is kept substantially equal to that in the second communication pipe 8 through the equalizer 12.

A lower exit of the storage tank 29 air-tightly communicates with a top entry of the service tank 7 by a third communication pipe 30. A third rotary valve 31 is installed in the middle of the third communication pipe 30. The top portion of the service tank 7 is connected with the equalizer 12 by another equalizer 12'. A gate valve 32 is installed in the middle of the equalizer 12'. In a state in which the third rotary valve 31 is closed and the gate valve 32 is open, the pressure in the service tank 7 is substantially equal to the pressure in the second communication pipe 8 through the equalizers 12 and 12'. Therefore, in a state in which the gate valve 32 is closed, the first rotary valve 5 is closed, and the third rotary valve 31 is open, the fine material 11 contained in the storage tank 29 is supplied from the storage tank 29 through the third communication pipe 30 into the service tank 7. In a state in which the gate valve 32 is open, the first rotary valve 5 is open, and the third rotary valve 31 is closed, the fine material 11 contained in the service tank 7 is supplied from the service tank 7 through the first communication pipe 4 into the hopper 2. The fine material 11 contained in the hopper 2 is supplied through the second communication pipe 8 into the transport pipe 1, and transported by the air flowing through the transport pipe 1 to the other end of the transport pipe 1.

In FIG. 2, 3 is a load cell as the weighing means, attached to the hopper 2, for continuously measuring the weight of a fine material 11 contained in the hopper 2. The hopper 2 is supported through the load cell 3 on an appropriate supporting means (not shown).

As shown in FIG. 2, in the upstream of the point of supply of the fine material 11 into the transport pipe 1 in the flowing direction of the air flowing through the transport pipe 1, an air flow meter 17 as the flow rate measuring means for measuring the flow rate of the air flowing through the transport pipe 1 is installed in the transport pipe 1, and in the further upstream thereof, a flow control valve 18 is provided in the transport pipe 1. The degree of opening of the flow control valve 18 is controlled by a flow controller 19. The air flow meter 17 measures the pressure drop corresponding to the flow rate of the air flowing through the transport pipe 1, and feeds a measured value "$\Delta P_{ao}$" thus obtained to a calculator 21 as the flow rate calculating means. In the calculator 21, the flow rate of the air flowing through the transport pipe 1 is calculated by the following formula:

$$G_a = C_3 \cdot \sqrt{\Delta P_{ao}}$$

where,
$G_a$: calculated value of the flow rate of the air flowing through the transport pipe 1
$C_3$: constant
$\Delta P_{ao}$: measured value of the pressure drop corresponding to the flow rate of the air flowing through the transport pipe 1 measured by the air flow meter 17.

The value "$G_a$" thus obtained is fed to the flow controller 19, and the degree of opening of the flow control valve 18 is controlled by the flow controller 19 so that the value "$G_a$" becomes a previously set value. The flow rate of the air flowing through the transport pipe 1 in the downstream of the flow control valve 18 is thus controlled to keep a constant value.

The fine material 11 is continuously supplied from the hopper 2 through the second communication pipe 8 into the transport pipe 1 by controlling the first rotary valve 5 and the second rotary valve 9 by a valve controller 15 as follows. The second rotary valve 9 is continuously open from the moment of starting transportation, irrespective of whether the first rotary valve 5 is opened or closed. Therefore, the fine material 11 contained in the hopper 2 is continuously supplied through the second communication pipe 8 into the transport pipe 1. On the other hand, an output signal of the load cell 3 is amplified by an amplifier 13, and fed to the valve controller 15. In the valve controller 15, an upper limit value "$W_{UU}$" and a lower limit value "$W_{LL}$" of the weight of the fine material 11 contained in the hopper 2 are set up. The value "$W_{UU}$" is the maximum weight of the fine material usually capable of being contained in the hopper 2, and "$W_{LL}$" is the minimum weight of the fine material contained in the hopper 2 capable of being continuously supplied into the transport pipe 1 without trouble. Therefore, unless a signal as described later is fed to the valve controller 15, opening and closing of the first rotary valve 5 are controlled by the valve controller 15 as follows. The fine material 11 contained in the service tank 7 is supplied into the hopper 2 through the first communication pipe 4, by continuously opening the first rotary valve 5 by the valve controller 15, until a measured value obtained by the load cell 3 reaches the upper limit value "$W_{UU}$". Then, at the moment when the measured value obtained by the load cell 3 reaches the upper limit value "$W_{UU}$", the first rotary valve 5 is closed by the valve controller 15. Subsequently, at the moment when the measured value obtained by the load cell 3 reaches the lower limit value "$W_{LL}$", the first rotary valve 5 is opened by the valve controller 15, and the first rotary valve 5 is kept open by the valve controller 15 until the measured value obtained by the load cell 3 reaches the upper limit value "$W_{UU}$". The fine material 11 is thus continuously supplied from the hopper 2 to the transport pipe 1 through the second communication pipe 8.

In FIG. 2, 62 is a pressure drop measuring means comprising a differential pressure gauge 20 and two annuli (described later). The two annuli (described later) are fitted to two prescribed points of the transport pipe 1 in the axial direction thereof so as to be integral with the transport pipe 1. The differential pressure gauge 20 communicates with said two annuli (described later) by each of two pipes 20a. Therefore, the pressure drop of the two-phase solid-gas flow comprising the fine material 11 and the air, which is flowing through the transport pipe 1 is measured by the differential pressure gauge 20 for the portion between said prescribed two points of the transport pipe 1 in the axial direction thereof. An output signal of the differential pressure gauge 20 is fed to the calculator 21 in which the flow rate of the fine material 11 flowing through the transport pipe 1 is calculated in accordance with the following formulae:

$$m = k(\alpha - 1)$$

$$\alpha = \Delta P_T / \Delta P_a$$

$$\Delta P_a = C_1 \cdot \gamma \cdot U_a^2$$

$$U_a = C_2 \cdot G_a$$

$$G_s = m \cdot G_a$$

where,
m: mixing weight ratio of the air and the fine material 11 between said prescribed two points of the transport pipe 1 in the axial direction thereof
$\alpha$: ratio of the pressure drop
$\alpha = \Delta P_T / \Delta P_a$
$\Delta P_T$: measured value of the pressure drop of the two-phase solid-gas flow which is flowing through the transport pipe 1, between said prescribed two points of the transport pipe 1 in the axial direction thereof $\Delta P_T = \Delta P_s + \Delta P_a$ $\Delta P_s$: pressure drop caused by a flow of a fine material 11 in the two-phase solid-gas flow which is flowing through the transport pipe 1, between said prescribed two points of the transport pipe 1 in the axial direction thereof $\Delta P_a$: calculated value of the pressure drop caused by a flow of the air in the two-phase solid-gas flow which is flowing through the transport pipe 1, between said prescribed two points of the transport pipe 1 in the axial direction thereof $U_a$: calculated value of the flow velocity of the air flowing through the transport pipe 1

$G_a$: calculated value of the flow rate of the air flowing through the transport pipe 1

$G_s$: calculated value of the flow rate of the fine material 11 flowing through the transport pipe 1

$\gamma$: density of the air $C_1$: constant dependent on the measured values of the velocity and the density of the air flowing through the transport pipe 1 in the absence of the fine material 11

$C_2$: constant dependent on the shape of the transport pipe 1 and the conditions of the air $k$: constant dependent on the shape of the transport pipe 1 and the physical properties of the fine material 11.

As shown in FIG. 2, an output signal of the load cell 3 is fed to a correction controller 22 as well in addition to the valve controller 15. The correction controller 22 issues four signals comprising the first second, third and fourth signals. An output signal of the valve controller 15 for controlling opening and closing of the first rotary valve 5 is also fed to the correction controller 22 as well in addition to the first rotary valve 5. The reference numeral 28 represents a correction commander. An output signal of the correction commander 28 is fed to the correction controller 22 for actuating the correction controller 22, for example, once or several times a day. An output signal of the calculator 21 is fed to the multiplier 23 and the integrator 25. A switch 24 for opening and closing the path of an output signal of the calculator 21 is provided between the calculator 21 and the integrator 25. The switch 24 closes the path by the first output signal of the correction controller 22. An output signal of the integrator 25 is fed to a divider 27 through an integral value holder 26 under specific conditions as described later. The correction controller 22 is actuated by an output signal of the correction commander 28 as follows.

Figure 3:
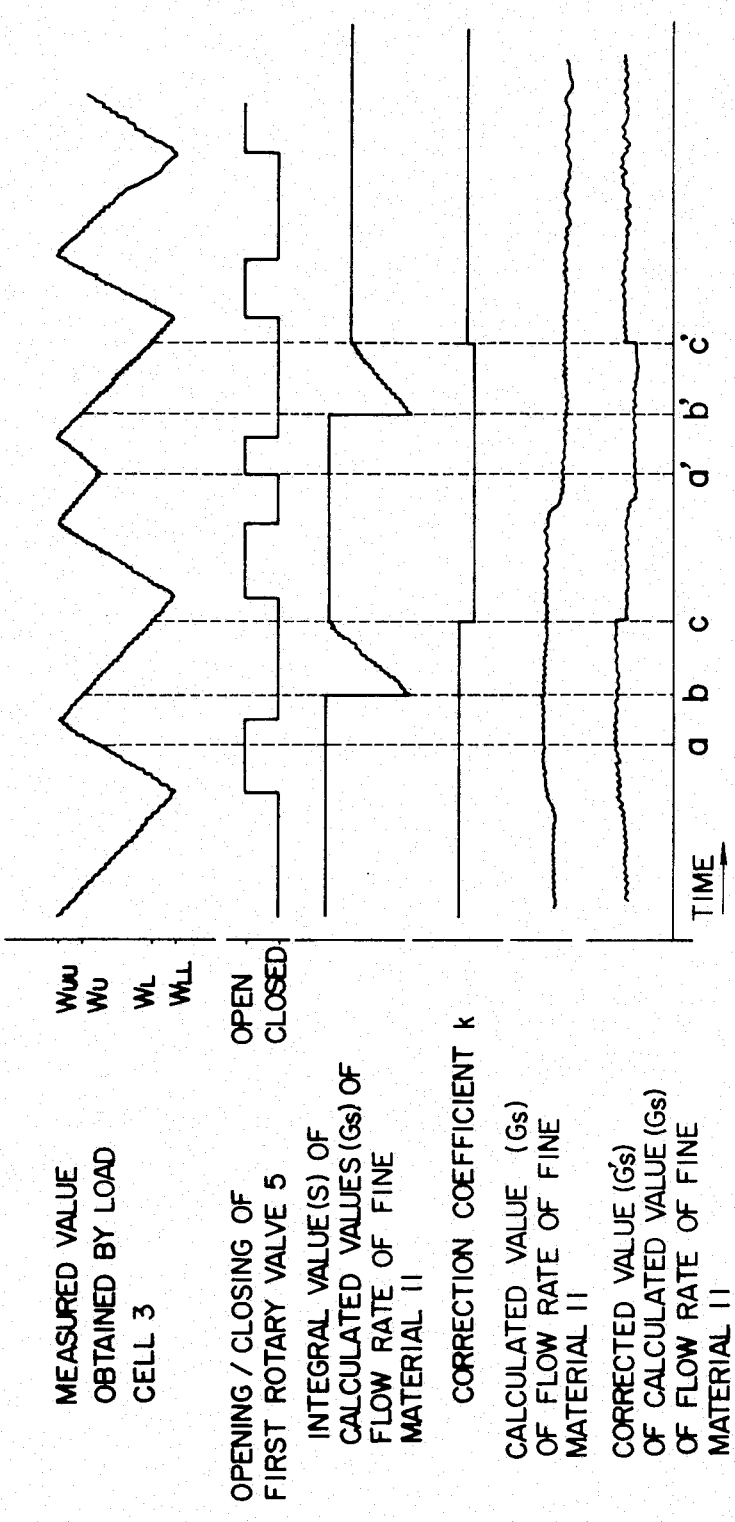
FIG. 3 is a time chart for illustrating the actuation of various parts in an embodiment of the apparatus of the present invention for continuously measuring the flow rate of the fine material flowing through the transport pipe.

(1) As shown in FIG. 3, when a time point "a" at the time when an output signal of the correction commander 28 is fed to the correction controller 22 is in the open state of the first rotary valve 5, the correction controller 22 closes the first rotary valve 5 at the moment when, after the lapse of a prescribed period of time from the time point "a", a measured value obtained by the load cell 3 becomes equal to "$W_{UU}$", and then, closes the switch 24 at a time point "b" when, after further lapse of another prescribed period of time, a measured value obtained by the load cell 3 becomes equal to "$W_U$" which is smaller than "$W_{UU}$" by a prescribed value. As a result, an output signal of the calculator 21 is fed to the integrator 25. On the other hand, as shown in FIG. 3, when another time point "a'" at the time when an output signal of the correction commander 28 is fed to the correction controller 22 is in the closed state of the first rotary valve 5, the correction controller 22 immediately feeds the second output signal to the valve controller 15 for opening the first rotary valve 5, thus causing the first rotary valve 5 to open, then, closes the first rotary valve 5 at the moment when, after the lapse of another prescribed period of time, a measured value obtained by the load cell 3 becomes equal to "$W_{UU}$", and then, closes the switch 24 at a time point "b'" at the time when a measured value obtained by the load cell 3 becomes equal to "$W_U$" after the lapse of further another prescribed period of time. As a result, an output signal of the calculator 21 is fed to the integrator 25.

(2) Then, at time points "c" and "c'" at which a measured value obtained by the load cell 3 changes from "$W_U$" into a value equal to "$W_L$" which is larger than "$W_{LL}$" by a prescribed value, the correction controller 22 acts as follows: (I) turning the switch 24 to open; (II) starting actuating of the integral value holder 26 by the third output signal; (III) starting actuation of the divider 27 by the fourth output signal; and, (IV) while the measured value obtained by the load cell 3 decreases from "$W_U$" to "$W_L$", calculating the total weight "$W$" of the fine material 11 supplied from the hopper 2 to the transport pipe 1, in compliance with the following formula:

$$W = W_U - W_L$$

where, $W$: calculated value of the total weight of the fine material supplied from the hopper 2 into the transport pipe 1 during the period of time in which the measured value obtained by the load cell 3 decreases from "$W_U$" to "$W_L$".

A signal of the calculated value "$W$" thus obtained is fed to the divider 27. The calculated value "$W$" may be stored in advance in the divider 27.

As shown by time points "b" and "b'" in FIG. 3, the integrator 25 begins integration of output signals of the calculator 21 by closing the switch 24, and stops integrating by opening the switch 24.

The integral value holder 26 is actuated by the third output signal of the correction controller 22 to hold the then integral value "$S$" of the output signal of the integrator 25 and to feed "$S$" into the divider 27.

The divider 27 is actuated by the fourth output signal of the correction controller 22 to calculate a correction coefficient "$k$" ($k = W/S$), i.e., the ratio "$W/S$" of said calculated value "$W$" to the integral value "$S$" upon the completion of integration on the basis of the opening of the switch 24. An output of the divider 27 is fed to the multiplier 23.

The multiplier 23 holds an output signal of the divider 27, i.e., the value of the correction coefficient "$k$" until a next another output signal is fed by the divider 27, calculates a product $k \cdot G_s$ of "$k$" and a calculated value of "$G_s$" of an output signal of the calculator 21, as the corrected value "$G_s'$" of the flow rate of the fine material 11 flowing through the transport pipe 1 after the time point of the end of said integration on the basis of opening the switch 24, and feeds the value "$G_s'$" thus obtained into a recording or displaying means (not shown). At the startup of this apparatus for continuously measuring the flow rate of the fine material 11, $k = 1$ is set up in the multiplier 23.

The flow rate of the fine material 11 flowing through the transport pipe 1 is measured as follows by the apparatus for continuously measuring the flow rate of the fine material 11, having a construction as described above. More specifically, the flow rate of the fine material 11 flowing through the transport pipe 1 is first calculated by the calculator 21, on the basis of an output signal of the air flow meter 17 and an output signal of the differential pressure gauge 20. On the other hand, the fine material 11 is intermittently supplied from the service tank 7 into the hopper 2 so that the measured value obtained by the load cell 3 varies between "$W_{UU}$" and "$W_{LL}$".

Then, when, while the first rotary valve 5 is open, for example as shown by the time point "a" in FIG. 3, an output signal of the correction commander 28 is fed to the correction controller 22, the first rotary valve 5 is kept open until a measured value obtained by the load cell 3 reaches "$W_{UU}$", and the first rotary valve 5 is closed at the moment when the measured value obtained by the load cell 3 becomes equal to "$W_{UU}$".

Then, as shown by the time point "b" in FIG. 3, the switch 24 is closed at the moment when the measured value obtained by the load cell 3 becomes equal to "$W_U$", and the integrator 25 begins integration of output signals of the calculator 21.

Then, as shown by the time point "c" in FIG. 3, the switch 24 is opened at the moment when a measured value obtained by the load cell 3 becomes equal to "$W_L$", and the integrator 25 discontinues integration. The integral value "S" of output signals of the calculator 21 at this moment is held by the integral value holder 26 and fed to the divider 27.

Then, the divider 27 calculates the ratio "k":

$$k = W/S$$

which is the ratio of the calculated value "W" of the total weight of the fine material 11 fed from the hopper 2 into the transport pipe 1 during the period of integration from the time point "b" to the time point "c", as calculated from measured values obtained by the load cell 3 for said period of integration, on one hand, to the integral value "S" of output signals of the calculator 21 at the time point "c", and feeds the value of "k" to the multiplier 23.

The multiplier 23 holds the value of "k" thus obtained until the next output signal is fed by the divider 27, calculates the product of this "k" multiplied with the calculated value "$G_s$" of the output signals of the calculator 21 in compliance with the following formula:

$$G_s' = k \cdot G_s$$

and feeds the value "$G_s'$" thus obtained to the recording means and the like (not shown) as the measured value of the flow rate of the fine material 11 flowing through the transport pipe 1.

The above description has covered the operations carried out during the period from the time point "a" to the time point "c" in FIG. 3 to illustrate the measuring procedures of the flow rate of the fine material 11 flowing through the transport pipe 1. This is also the case with the period from the time point "a'" to the time point "c'" in FIG. 3.

Figure 4:
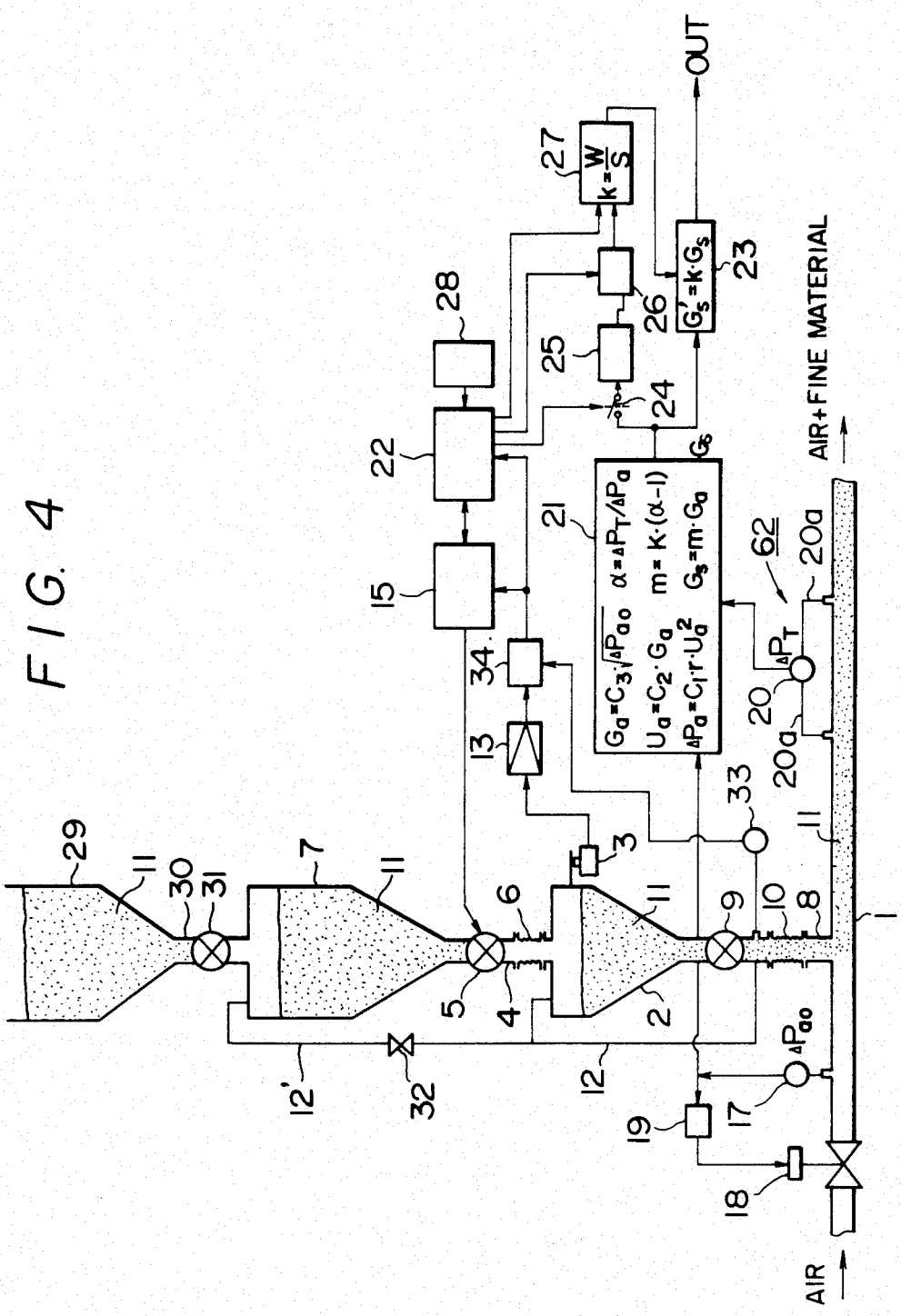
FIG. 4 is a schematic constructional view illustrating another embodiment of the apparatus of the present invention for continuously measuring the flow rate of the fine material flowing through the transport pipe.

FIG. 4 is a schematic constructional view illustrating another embodiment of the apparatus of the present invention for continuously measuring the flow rate of the fine material flowing through the transport pipe.

In FIG. 4, 33 is a manometer for measuring the pressure in the second communication pipe 8. An output signal of the manometer 33 is fed to a weight corrector 34. The output signal of the amplifier 13 is also fed to the weight corrector 34. An output signal of the weight corrector 34 is fed to the valve controller 15 and a correction controller 22.

Figure 5:
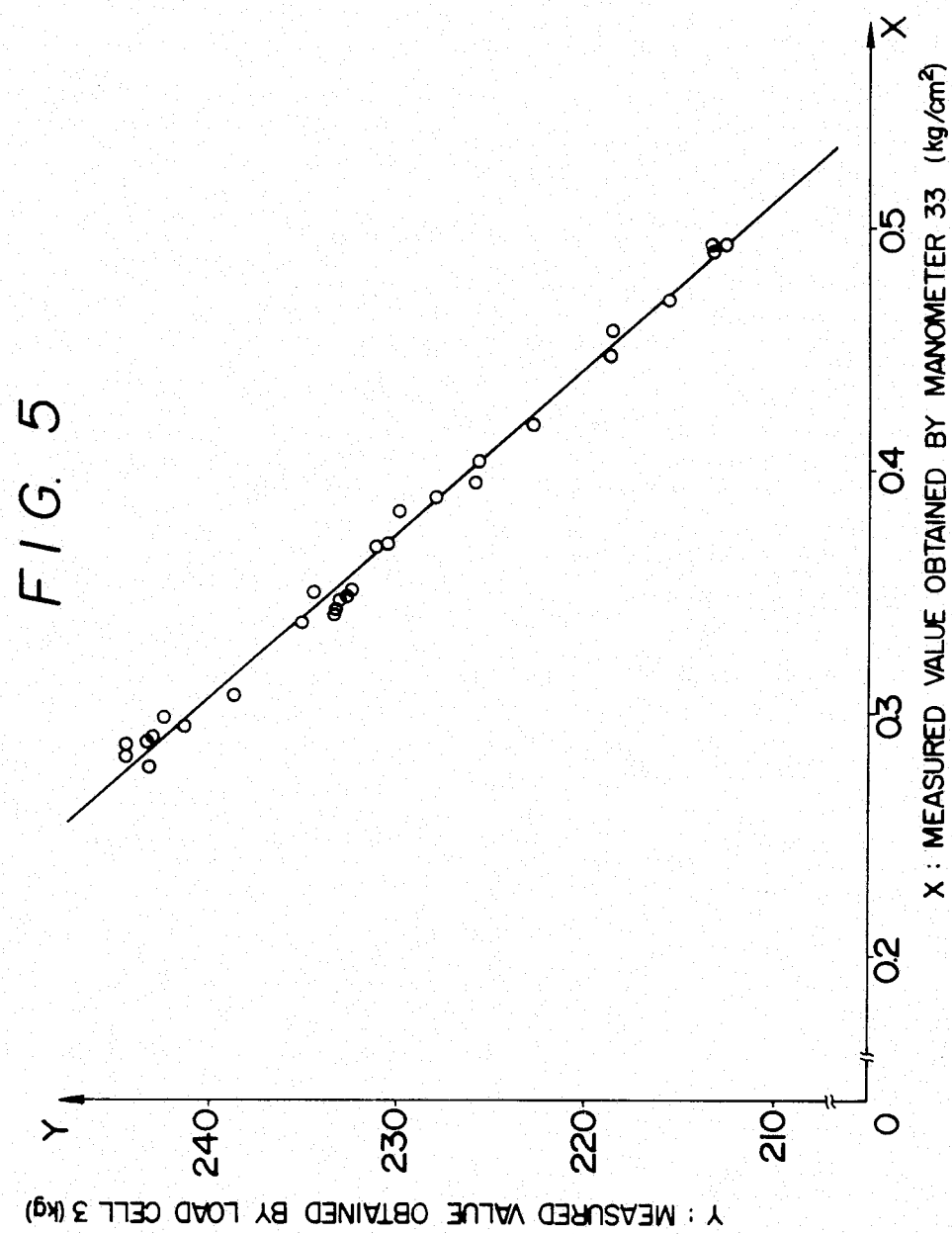
FIG. 5 is a graph illustrating the relation between the measured values of a manometer and the measured values of a load cell.

There is the following relationship between the measured value obtained by the manometer 33 and the measured value obtained by the load cell 3. When there is a difference between the cross-sectional area of the first communication pipe 4 and that of the second communication pipe 8, a force represented by the product of this difference in area and the pressure of the air flowing through the transport pipe 1 is applied to the hopper 2. For example, when the second communication pipe 8 has a larger cross-sectional area than that of the first communication pipe 4, the above-mentioned force is exerted upward on the hopper 2. Therefore, because of the hopper 2 subjected to this upward force, the measured value obtained by the load cell 3 shows a smaller weight than the true weight of the fine material 11 contained in the hopper 2. When the second communication pipe 8 has a smaller cross-sectional area than that of the first communication pipe 4, the measured value obtained by the load cell 3 shows a larger weight than the true weight of the fine material 11 contained in the hopper 2. FIG. 5 is a view illustrating an example of the relationship between the measured value obtained by the manometer 33 and the measured value obtained by the load cell 3 under various values of pressure of the air flowing through the transport pipe 1, in case that the cross-sectional area of the second communication pipe is larger by 139.925 cm$^2$ than that of the first communication pipe 4 and the weight of the fine material 11 contained in the hopper 2 is constant. It is apparent from FIG. 5 that the measured value obtained by the manometer 33 is substantially proportional to the measured value obtained by the load cell 3. In FIG. 5, the straight line is a least squares approximation line based on a correlation coefficient of $r = 0.9963$ and a plurality of data, and is expressed by the following formula:

$$Y = -145.80 \cdot X + 284.64$$

where,

Y: measured value obtained by the load cell 3
X: measured value obtained by the manometer 33

Therefore, it is possible to calculate a measured value "$W_a'$" of the weight of the fine material 11 contained in the hopper 2, to be fed to the valve controller 15 and the correction controller 22, by means of the weight corrector 34 in accordance with the following formula, so as to be free of the effect of the pressure of the air flowing through the transport pipe 1, caused by the difference in the cross-sectional area between the first communication pipe 4 and the second communication pipe 8:

$$W_a' = W_a + C_4 \cdot P$$

where, $W_a$: measured value obtained by the load cell 3
P: measured value obtained by the manometer 33
$C_4$: constant FIG. 6 is a sectional view illustrating an embodiment of the annuli each of which is fitted to each of the prescribed two points of the transport pipe 1 in the axial direction thereof, for measuring the pressure drop of the two-phase solid-gas flow comprising the fine material 11 and the carrier air, which is flowing through the transport pipe 1. FIG. 7 is a sectional view cut along the line A—A of FIG. 6.

In FIGS. 6 and 7, 35 are the annuli each of which is fitted to the transport pipe 1 at each of the prescribed two points of the transport pipe 1 in the axial direction thereof so as to be integral with the transport pipe 1. Each annulus 35 has the same inside diameter as that of the transport pipe 1. As shown in FIG. 6, the annulus 35 is air-tightly fixed to the transport pipe 1 at each of said prescribed two points of the transport pipe 1 by means of plural sets of bolts 36 and nuts 37 through a pair of flange 1a and 1b of the transport pipe 1 so as to form part of transport pipe 1. O-rings 38 are provided between both end of the annulus 35 and the pair of flange 1a, 1b to ensure air-tightness therebetween.

An annular space 35a is formed in the annulus 35 in the circumferential direction thereof. An annular slit 40a is formed in the interior of the annulus 35 as the opening to permit communication of the annular space 35a with the interior of the transport pipe 1. The annular slit 40a is provided with a filter 39 for preventing the fine material 11 which flows through the transport pipe 1 from coming into the annular space 35a. The filter 39 is made of, for example, porous ceramic or stainless steel having a mesh smaller than the particle size of the fine material 11.

As shown in FIG. 7, a pressure measuring through-hole 35b for opening the annular space 35a toward outside and a purging through-hole 35c are formed in the top outside portion of the annulus 35. Similarly, a fine material discharging through-hole 35d for opening the annular space 35a toward outside is formed in the bottom outside portion of the annulus 35. Also in FIG. 7, 35'b, 35'c and 35'd are taps respectively for the through-holes 35b, 35c and 35d. The taps 35'b, 35'c and 35'd are fixed to the outer surface of the annulus 35. An end of a pipe 20a shown in FIG. 4, of which the other end is connected to the differential pressure gauge 20, is connected to the tap 35'b. An end of another pipe (not shown) from an appropriate purging air source (not shown) is connected to the tap 35'c. An appropriate plug (not shown) is air-tightly fitted to the tap 35'd.

The annulus 35 has a construction as mentioned above. Therefore, the pressure of the two-phase solid-gas flow comprising the fine material 11 and the air, which is flowing through the transport pipe 1, is transmitted from the transport pipe 1, sequentially through the annular slit 40a, the filter 39, the annular space 35a, the through-hole 35b, the tap 35'b and the pipe 20a, to the differential pressure gauge 20. In this transmission of the pressure, the filter 39 effectively prevents the fine material 11 which is flowing through the transport pipe 1 from coming into the annular space 35a. Even when the filter 39 is clogged up with the fine material 11 as a result of the use of the annulus 35 for transporting the fine material 11 for a long period of time, it is possible to blow the fine material 11 deposited on the filter 39 back into the transport pipe 1, by blowing as required the purging air from an appropriate purging air source (not shown) sequentially through a pipe (not shown), the tap 35'c and the through-hole 35c into the annular space 35a, and using the purging air thus blown into the annular space 35a. It is also possible to discharge the fine material 11 depositing in the annular space 35a of the annulus 35 through the through-hole 35d, by removing the plug (not shown) from the tap 35'd.

Figure 9:
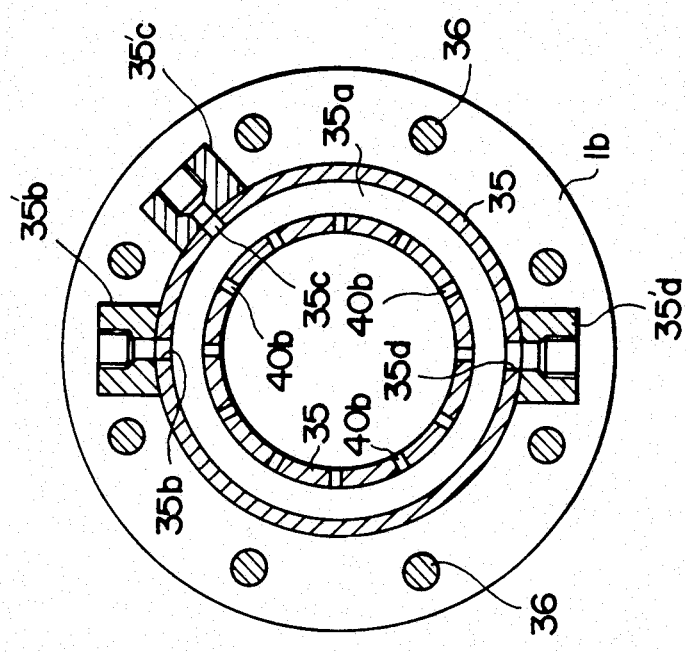
FIG. 9 is a sectional view cut along line B—B of FIG. 8.
Figure 8:
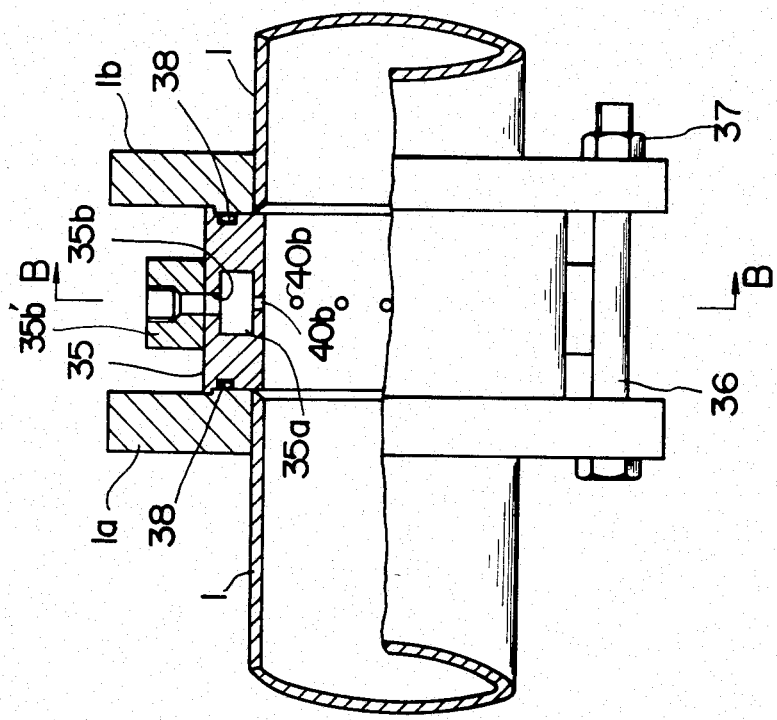
FIG. 8 is a sectional view illustrating another embodiment of the annuli each of which is fitted to each of the prescribed two points of the transport pipe in the axial direction thereof, for measuring the pressure drop of the two-phase solid-gas flow comprising the fine material and the carrier air which is flowing through the transport pipe while transporting the fine material.

FIG. 8 is a sectional view illustrating another embodiment of the annuli each of which is fitted to each of said prescribed two points of the transport pipe 1 in the axial direction thereof for measuring the pressure drop of the two-phase solid-gas flow comprising the fine material 11 and the carrier air, which is flowing through the transport pipe 1. FIG. 9 is a sectional view cut along the line B—B of FIG. 8.

As shown in FIGS. 8 and 9, a plurality of apertures 40b are formed in the interior of the annulus 35 as the opening for communicating the annular space 35a with the interior of the transport pipe 1.

Therefore, the pressure of the two-phase solid-gas flow comprising the fine material 11 and the air, which is flowing through the transport pipe 1 is transmitted from the transport pipe 1 sequentially through the apertures 40b, the annular space 35a, the through-hole 35b, the tap 35'b, and the pipe 20a to the differential pressure gauge 20. In this transmission of the pressure, the apertures 40b effectively prevent the fine material 11 which is flowing through the transport pipe 1 from coming into the annular space 35a. Even when the apertures 40b are clogged up with the fine material 11 as a result of the use of the annulus 35 for transporting the fine material 11 for a long period of time, it is possible to blow the fine material 11 adhering to the apertures 40b back into the transport pipe 1, by blowing the purging air from an appropriate purging air source (not shown) sequentially through a pipe (not shown), the tap 35'c, and the through-hole 35c into the annular space 35a, and using the purging air thus blown into the annular space 35a.

FIG. 10 is a view illustrating a schematic construction of another embodiment of the pressure drop measuring means 62 of the present invention for measuring the pressure drop of the two-phase solid-gas blow comprising the fine material 11 and the carrier air, which is flowing through the transport pipe 1, and showing an example of pressure gradient in this pressure drop measuring means 62.

As shown in FIG. 10, the pressure drop measuring means 62 comprises the differential pressure gauge 20 and two measuring pipes 41. An end of each of the two measuring pipes 41 having the same diameter is connected with each of said prescribed two points of the transport pipe 1 in the axial direction thereof to communicate with the transport pipe 1. The other end of each of the two measuring pipes 41 is connected to an end of a pipe 43 extended from an air source 42 as the purging gas source for supplying the air as the purging gas into the measuring pipes 41. A reducing valve 44 and a manometer 45 are provided in the middle of the pipe 43. Each of two chambers 46 as the pressure detectors is formed in the middle of each of the two measuring pipes 41. An end of each of two pipes 20a extended from the differential pressure gauge 20 is connected to each of the two chambers 46. The difference in pressure between the two chambers 46 is measured by the differential pressure gauge 20 through the two pipes 20a. A flow meter 47 and a flow control valve 48 are provided in the middle of each of the two measuring pipes 41 between the other end of each of the two measuring pipes 41 and each of the two chambers 46. The two chambers 46 have the same size.

The pressure drop measuring means 62 having a construction as mentioned above measures the pressure drop of the two-phase solid-gas flow comprising the fine material 11 and the air, which is flowing through the transport pipe 1, between said prescribed two points of the transport pipe 1 in the axial direction thereof, as follows: The purging air is supplied from the purging air source 42 into each of the two measuring pipes 41 so as to enable the purging air to flow out from an end of each of the two measuring pipes 41 into the transport pipe 1, resisting to the pressure of the air transporting the fine material 11 flowing through the transport pipe 1. With the use of the two flow meters 47 and the two flow control valves 48, the volume of the purging air blown from an end of one of the two measuring pipes 41 into the transport pipe 1 is kept equal to that of the purging air blown from an end of the other measuring pipe 41 into the transport pipe 1. As a result, the pressure gradients in the two chambers 46 become parallel to each other, and the pressure gradients in the two measuring pipes 41 between each of the two flow control valves 48 and an end of each of the two measuring pipe 41 become parallel to each other. More specifically, as shown in FIG. 10, among the pressures "$P_1$" and "$P_2$" at ends of the two measuring pipes 41, the pressures "$P'_1$" and "$P'_2$" in the two chambers 46, and the pressure "$P''_1$" and "$P''_2$" in the two measuring pipes 41 at downstream ends of the two flow control valves 48, a relationship as expressed by the following formula is established:

$$P_1 - P_2 = P'_1 - P'_2 = P''_1 - P''_2$$

Therefore, the pressure drop between ends of the two measuring pipes 41 on the transport pipe 1, i.e., the pressure difference "$\Delta P$" is equal to the pressure difference "$\Delta P'$" between the two chambers 46.

It is thus possible to accurately measure the pressure drop of the two-phase solid-gas flow comprising the fine material 11 and the air which is flowing through the transport pipe 1, as measured between said prescribed two points of the transport pipe 1 in the axial direction thereof by measuring the pressure difference between the two chambers 46 with the use of the differential pressure gauge 20 connected to the two chambers 46. on the other hand, the purging air is blown from an end of each of the two measuring pipes 41 into the transport pipe 1, resisting to the pressure of the air transporting the fine material 11, which is flowing through the transport pipe 1. Therefore, the fine material 11 flowing through the transport pipe 1 is effectively prevented from coming into the two measuring pipes 41. Even if the fine material 11 comes into the measuring pipes 41, ingression of the fine material 11 into the differential pressure gauge 20 is inhibited because of the fine material 11 staying in the chambers 46. Since the chambers 46 have a larger inside diameter than that of the measuring pipes 41, the pulsation of the pressure of the air transporting the fine material 11 through the transport pipe 1 is prevented from affecting the differential pressure gauge 20. It is not always necessary to provide chambers 46. In the case without chambers 46, it suffices to connect an end of the pipe 20a extended from the differential pressure gauge 20 to the outside of the measuring pipes 41.

FIG. 11 is a schematic constructional view illustrating an embodiment of the arrangement for determining the density and the flow velocity of the fine material 11 flowing through the transport pipe 1.

As shown in FIG. 11, a density measuring means 63 comprises a pair of electrodes 50a and a density calculator 51a as the density calculating means, and a flow velocity measuring means 64 comprises two pairs of electrodes 50a and 50b and a flow velocity calculator 51'a as the flow velocity calculating means. A ceramic pipe 49 is attached to a point on the transport pipe 1 by a pair of flange joints 49a so as to be integral with the transport pipe 1. The ceramic pipe 49 has the same inside diameter as that of the transport pipe 1. Each of the two pairs of electrodes 50a and 50b, i.e., each of the first pair of electrodes 50a and the second pair of electrodes 50b is provided on the outer surface of the ceramic pipe 49 at each of two points of the ceramic pipe 49 in the axial direction thereof so as to be opposite to each other with the ceramic pipe 49 in between to cover the outer surface of the ceramic pipe 49. The density and the flow velocity of the fine material 11 flowing through the transport pipe 1 are determined as follows:

(1) impressing an AC voltage having a prescribed value between the first pair of electrodes 50a and between the second pair of electrodes 50b by the density calculator 51a and the flow velocity calculator, 51'a, respectively;

(2) detecting, by the density calculator 51a, the electrostatic capacity between the first pair of electrodes 50a on the basis of the value of AC current flowing between the first pair of electrodes 50a in response to the density of the fine material 11 flowing through the ceramic pipe 49, and, in the same manner as mentioned above, detecting the electrostatic capacity between the second pair of electrodes 50b by the flow velocity calculator 51'a;

(3) calculating, by the density calculator 51a, the density "$\rho$" of the fine material 11 flowing through the ceramic pipe 49, between the first pair of electrodes 50a, on the basis of the following formula with the use of the resultant detected value of electrostatic capacity between the first pair of electrodes 50a:

$$\rho \propto \frac{\rho_s}{\epsilon_s} \cdot \Delta C$$

where,
$\rho_s$: specific gravity of the fine material 11,
$\epsilon_s$: dielectric constant of the fine material 11,
$\Delta C$: electrostatic capacity between the first pair of electrodes 50a.

(4) calculating, by the flow velocity calculator 51'a the time lag in detection between the pattern of detected values of electrostatic capacity obtained by the first pair of electrodes 50a installed in the upstream of the ceramic pipe 49, on one hand, and the pattern of detected values of electrostatic capacity obtained by the second pair of electrodes 50b installed in the downstream of the ceramic pipe 49, on the other hand, these patterns showing the same variation;

(5) calculating, by the flow velocity calculator 51'a, the flow velocity "V" of the fine material 11 flowing through the ceramic pipe 49, on the basis of the calculated value of time lag in detection thus obtained and the distance "l" between the first pair of electrodes 50a and the second pair of electrodes 50b, as shown in FIG. 11.

Thus, the flow rate "$G_s$" of the fine material 11 flowing through the ceramic pipe 49, i.e., through the transport pipe 1, is calculated on the basis of the density "$\rho$" and the flow velocity "V" of the fine material 11 flowing through the ceramic pipe 49 obtained by the density calculator 51a and the flow velocity calculator 51'a, and the cross-sectional area "A'" of the ceramic pipe 49 previously determined:

$$G_s = A' \cdot \rho \cdot V$$

FIG. 12 is a schematic constructional view illustrating another embodiment of the arrangement for determining the density and the flow velocity of the fine material flowing through the transport pipe 1.

As shown in FIG. 12, the density measuring means 63 comprises a set of ultrasonic transmitter 52a and receiver 53a and a density calculator 51b as the density calculating means, and the flow velocity measuring means 64 comprises a first set of ultrasonic transmitter 52a and receiver 53a, a second set of ultrasonic transmitter 52b and receiver 53b, and a flow velocity calculator 51'b as the flow velocity calculating means. Each set of the first and the second sets of ultrasonic transmitters and receivers (52a, 53a; 52b, 53b) is installed on the outer surface of the transport pipe 1 at each of two points of the transport pipe 1 in the axial direction thereof so that the transmitter 52a or 52b and the receiver 53a or 53b are opposite to each other with the transport pipe 1 in between. The first transmitter 52a is controlled by the density controller 51b, and the second transmitter 52b is controlled by the flow velocity calculator 51'b. An output signal of the first receiver 53a is fed to the density calculator 51b, and an output signal of the second receiver 53b is fed to the flow velocity calculator 51'b.

The density and the flow velocity of the fine material 11 flowing through the transport pipe 1 are determined as follows:

(1) ultrasonic waves are respectively transmitted from the first transmitter 52a and the second transmitter 52b into the transport pipe 1 through which the fine material 11 and the air are flowing;

(2) receiving, by the first receiver 53a, the ultrasonic wave from the first transmitter 52a to detect a strength of ultrasonic wave corresponding to the density of the fine material 11 flowing through the transport pipe 1, and similarly receiving, by the second receiver 53b, the ultrasonic wave from the second transmitter 52b to detect a strength of ultrasonic wave corresponding to the density of the fine material 11 flowing through the transport pipe 1;

(3) calculating, by the density calculator 51b, a density "ρ" of the fine material 11 flowing through the transport pipe 1, between the first transmitter 52a and the first receiver 53a, on the basis of the resultant detected value obtained by the first receiver 53a;

(4) calculating, by the flow velocity calculator 51'b, a time lag in detection between a variation pattern of the detected values obtained by the first receiver 53a and the same variation pattern of the detected values obtained by the second receiver 53b as that of the detected values obtained by the first receiver 53a;

(5) calculating, by the flow velocity calculator 51'b, flow velocity "V" of the fine material 11 flowing through the transport pipe 1, on the basis of the calculated value of the time lag thus obtained and the distance "l" between the first receiver 53a and the second receiver 53b.

Thus, the flow rate of the fine material 11 flowing through the transport pipe 1 is calculated by the calculator 21 on the basis of the density "ρ" and the flow velocity "V" thus obtained, and the cross-sectional area "A'" of the transport pipe 1.

FIG. 13 is a schematic constructional view illustrating further another embodiment of the arrangement for determining the density and the flow velocity of the fine material 11 flowing through the transport pipe 1.

As shown in FIG. 13, the density measuring means 63 comprises a set of radiation generator 54a and detector 55a, and a density calculator 51c as the density calculating means, and the flow velocity calculating means 64 comprises a first set of radiation generator 54a and detector 55a, a second set of radiation generator 54b and detector 55b, and a flow velocity calculator 51'c as the flow velocity calculating means. Each set of the first and the second sets of generators and detectors (54a, 55a; 54b, 55b) is installed on the outer surface of the transport pipe 1 at each of two points of the transport pipe 1 in the axial direction thereof so that the generator 54a or 54b and the detector 55a or 55b are opposite to each other with the transport pipe 1 in between. The first generator 54a is controlled by the density calculator 51c, and the second generator 54b is controlled by the flow velocity calculator 51'c. An output signal of the first detector 55a is fed to the density calculator 51c, and an output signal of the second detector 55b is fed to the flow velocity calculator 51'c.

The density and the flow velocity of the fine material 11 flowing through the transport pipe 1 are determined as follows:

(1) emitting radiations respectively from the first generator 54a and the second generator 54b into the transport pipe 1 through which the fine material 11 and the air are flowing;

(2) receiving, by the first detector 55a, the radiation from the first generator 54a to detect an amount of the radiation corresponding to the density of the fine material 11 flowing through the transport pipe 1, and similarly receiving, by the second detector 55b, the radiation from the second generator 54b to detect an amount of the radiation corresponding to the density of the fine material 11 flowing through the transport pipe 1;

(3) calculating, by the density calculator 51c, a density "ρ" of the fine material 11 flowing through the transport pipe 1, between the first generator 54a and the first detector 55a, on the basis of the resultant detected value obtained by the first detector 55a;

(4) calculating, by the flow velocity calculator 51'a, time lag in detection between a variation pattern of the detected values obtained by the first detector 55a and the same variation pattern of the detected values obtained by the second detector 55b as that of the detected values obtained by the first detector 55a;

(5) calculating, by the flow velocity calculator 51'c, a flow velocity "V" of the fine material 11 flowing through the transport pipe 1, on the basis of the calculated value of the time lag thus obtained, and the distance "l" between the first detector 55a and the second detector 55b, as shown in FIG. 13.

Thus, the flow rate of the fine material 11 flowing through the transport pipe 1 is calculated by the calculator 21, on the basis of the density "ρ" and the flow velocity "V" thus obtained, and the cross-sectional area "A'" of the transport pipe 1.

FIG. 14 is a schematic constructional view illustrating an embodiment of the arrangement for determining the density of the fine material 11 flowing through the transport pipe 1.

As shown in FIG. 14, the density measuring means 63 comprises a detecting pipe 56, a galvanometer 58, and a density calculator 59 as the density calculating means.

The detecting pipe 56 is fitted to a point on the transport pipe 1 by a pair of flange joints 56'a so as to be integral with the transport pipe 1. The detecting pipe 56 has the same inside diameter as that of the transport pipe 1. The both ends of the detecting pipe 56 comprises electric insulators 56a.

The both ends of the galvanometer 58 are connected respectively to the detecting pipe 56 and an earth 57. An output signal of the galvanometer 58 is fed to the density calculator 59.

The detecting pipe 56 is electrically charged through contact of the fine material 11 flowing through the transport pipe 1 with the detecting pipe 56. Charging of the detecting pipe 56 causes detection of an electric current by the galvanometer 58. The value of electric current on the galvanometer 58 corresponds to the density of the fine material 11 flowing through the detecting pipe 56. Therefore, the density of the fine material 11 flowing through the transport pipe 1 is calculated by the density calculator 59 on the basis of the value of electric current on the galvanometer 58. The calculated value of density thus obtained is fed to the calculator 21. For example, an output signal from the flow velocity calculator 51'a as mentioned above with reference to FIG. 11 can be used as the calculated value of flow velocity of the fine material 11 flowing through the transport pipe 1, which is to be fed to the calculator 21.

Figure 15:
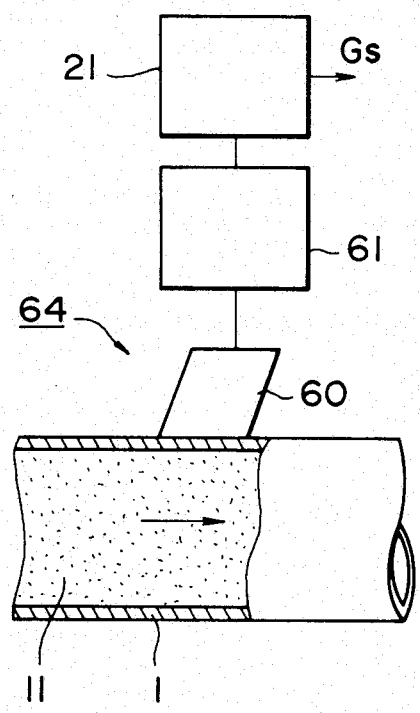

FIG. 15 is a schematic constructional view illustrating an embodiment of the arrangement for determining the flow velocity of the fine material 11 flowing through the transport pipe 1.

As shown in FIG. 15, the flow velocity measuring means 64 comprises a transmitter/receiver 60 of ultrasonic wave, and a flow velocity calculator 61 as the flow velocity calculating means. The transmitter/receiver 60 of ultrasonic wave which can transmit an ultrasonic wave and receive a reflected wave of the thus transmitted ultrasonic wave is installed on the outer surface of the transport pipe 1. The transmitter/receiver 60 transmits an ultrasonic wave into the transport pipe 1 so as to angularly intersect with the axial line of the transport pipe 1, and receives a reflected wave produced by the collision of the ultrasonic wave thus transmitted into the transport pipe 1 with the fine material 11 flowing through the transport pipe 1. The transmitter/receiver 60 transmits an ultrasonic wave of a prescribed frequency into the transport pipe 1, on the basis of an AC current of this prescribed frequency from the flow velocity calculator 61. Thus, the ultrasonic wave transmitted into the transport pipe 1 collides with the fine material 11 flowing through the transport pipe 1 to produce a reflected wave, and the thus produced reflected wave is received by the transmitter/receiver 60. The frequency of the thus received reflected wave corresponds to the flow velocity of the fine material 11 flowing through the transport pipe 1 under Doppler effect. Therefore, the flow velocity of the fine material 11 flowing through the transport pipe 1 is calculated by the flow velocity calculator 61, on the basis of the frequency of AC current caused by the received reflected wave from the transmitter/receiver 60. The calculated value of flow velocity thus obtained is fed to the calculator 21. For example, an output signal from the density calculator 51a mentioned above with reference to FIG. 11 can be used as the calculated value of density of the fine material 11 flowing through the transport pipe 1, which is to be fed to the calculator 21.

According to the apparatus of the present invention for continuously measuring the flow rate of a fine material flowing through a transport pipe, as described above in detail, it is possible to continuously obtain an accurate flow rate of the fine material flowing through the transport pipe over a long period of time.

What is claimed is:

1. In an apparatus for continuously measuring the flow rate of a fine material flowing through a transport pipe, which comprises:

a hopper (2) having a closed structure;

a fine material feeding means (7), arranged above said hopper (2), for feeding said hopper (2) with a fine material (11);

a weighing means (3) for continuously measuring the weight of the fine material (11) contained in said hopper (2);

a first communication pipe (4) for air-tightly communicating said fine material feeding means (7) and said hopper (2), said first communicating pipe (4) being adapted to introduce the fine material (11) in said fine material feeding means (7) into said hopper (2);

a first valve (5), provided in said first communication pipe (4), for opening and closing said first communication pipe (4);

a valve controller (15) for controlling opening and closing of said first valve (5), said valve controller (15) being adapted to control opening and closing of said first valve (5) in response to a measured value obtained continuously by said weighing means (3) so as to keep the weight of the fine material (11) contained in said hopper (2) within a prescribed range;

a transport pipe (1) arranged below said hopper (2);

a second communication pipe (8) for air-tightly communicating said hopper (2) and said transport pipe (1), said second communication pipe (8) being adapted to introduce the fine material (11) in said hopper (2) into said transport pipe (1);

a second valve (9), provided in said second communication pipe (8), for opening and closing said second communication pipe (8);

a carrier gas blowing means for blowing a carrier gas into said transport pipe for transporting the fine material (11) through said transport pipe (1);

an equalizer (12) for air-tightly communicating the top portion of said hopper (2) and said second communication pipe (8), said equalizer (12) being adapted to equalize the pressure in said hopper (2) with the pressure in said second communication pipe (8);

a flow rate calculating means (21) for calculating the flow rate of the fine material (11) flowing through said transport pipe (1), said flow rate calculating means (21) being adapted to continuously calculate the flow rate of the fine material (11) flowing through said transport pipe (1), on the basis of one of the following (A) and (B):

(A) a measured value ($G_a$) of the flow rate of the carrier gas flowing through said transport pipe (1) obtained by a flow rate measuring means (17), and a measured value ($\Delta P_T$) of the pressure drop of a two-phase solid-gas flow which is flowing through said transport pipe (1) obtained by a pressure drop measuring means (62), said two-phase solid-gas flow comprising the fine material (11) and the carrier gas, said pressure drop being measured between two prescribed points of the transport pipe (1) in the axial direction thereof, and, (B) a measured value of the density of the fine material (11) flowing through said transport pipe (1) obtained by a density measuring means (63), a measured value of the flow velocity of the fine material (11) flowing through said transport pipe (1) obtained by a flow velocity measuring means (64), and, the cross-sectional area of said transport pipe (1);

the improvement characterized by further comprising:

an integrator (25) for integrating calculated values ($G_s$) of the flow rate of the fine material (11) flowing through said transport pipe (1), which are obtained by said flow rate calculating means (21);

a correction controller (22), said correction controller (22) being adapted to calculate the total weight of the fine material (11) which is fed, during a prescribed period of time in the period for which said first communication pipe (4) is closed by said first valve (5), from said hopper (2) into said transport pipe (1), on the basis of said measured value obtained by said weighing means (3) and an output value of said valve controller (15), and, being adapted to actuate said integrator (25) during said prescribed period of time;

a correction commander (28) for informing said correction controller (22) of the starting point of said prescribed period of time;

a divider (27) for calculating a correction coefficient (k) i.e., the ratio (W/S) of a calculated value (W), obtained by said correction controller (22), of the total weight of the fine material (11) which is fed, during said prescribed period of time, from said hopper (2) into said transport pipe (1), to an integral value (S), for said prescribed period of time, obtained by said integrator (25); and, a multiplier (23) for calculating a corrected value ($G'_s$) of the flow rate of the fine material (11) flowing through said transport pipe (1), by multiplying said calculated value ($G_s$) obtained by said flow rate calculating means (21) with said correction coefficient (k).

2. The apparatus as claimed in claim 1, wherein:
a manometer (33) is installed in said second communication pipe (8);
a weight corrector (34) is installed between said weighing means (3) on one hand and said valve controller (15) and said correction controller (22) on the other hand, and, said weight corrector (34) is adapted to correct said measured value obtained by said weighing means (3) on the basis of a measured value of the pressure in said second communication pipe (8) obtained by said manometer (33), and the difference in the cross-sectional area between said first communication pipe (4) and said second communication pipe (8).

3. The apparatus as claimed in claim 1 or 2, wherein:
said pressure drop measuring means (62) comprises a differential pressure gauge (20) and two annuli (35);
said two annuli (35) are integrally fitted to said transport pipe (1) at said prescribed two points in the axial direction of said transport pipe (1), each of said two annuli (35) has the same inside diameter as that of said transport pipe (1);

an annular space (35a) is formed in the circumferential direction in the peripheral wall of each of said annuli (35);
an opening (40a, 40b) is formed over the entire circumference in the interior of each of said annuli (35) so as to ensure communication between said annular space (35a) and said transport pipe (1);
each of said annuli (35) has a pressure measuring through-hole (35b) for releasing said annular space (35a) to outside and a purging through-hole (35c), said pressure measuring through-hole (35b) is adapted to transmit the pressure of said two-phase solid-gas flow which is flowing through said transport pipe (1) from said transport pipe (1) through said opening (40a, 40b) and said annular space (35a) to said differential pressure gauge (20), and said purging through-hole (35c) is adapted to blow a purging gas for blowing a fine material (11) which adheres to said opening (40a, 40b) back into said transport pipe (1), into said annular space (35a).

4. The apparatus as claimed in claim 3, wherein:
said opening comprises an annular slit (40a), said annular slit (40a) being provided with a filter (39) for preventing the fine material (11) flowing through said transport pipe (1) from coming into said annular space (35a).

5. The apparatus as claimed in claim 3, wherein:
said opening comprises a plurality of apertures (40b).

6. The apparatus as claimed in claim 1 or 2, wherein:
said pressure drop measuring means (62) comprises a differential pressure gauge (20) and two measuring pipes (41) having the same diameter, ends of said two measuring pipes (41) are connected respectively to said prescribed two points in the axial direction of said transport pipe (1) so as to communicate with said transport pipe (1), the other ends of said two measuring pipes (41) are connected respectively to at least one purging gas source (42), a pressure detector (46) is installed in each of said two measuring pipes (41), said pressure detector (46) is connected to said differential pressure gauge (20), a flow meter (47) and a flow control valve (48) are provided in each of said two measuring pipes (41) between said purging gas source (42) and said pressure detector (46), and said flow control valve (48) is adapted to keep identical the volumetric flow rates of purging gases blown from said ends of said two measuring pipes (41) into said transport pipe (1).

7. The apparatus as claimed in claim 1 or 2, wherein:
said density measuring means (63) comprises a pair of half-cylindrical electrodes (50a) and a density calculating means (51a);
said pair of electrodes (50a) are installed on the outer surface of said transport pipe (1) at positions opposite to each other with said transport pipe (1) in between so as to cover the outer surface of said transport pipe (1), said pair of electrodes (50a) are adapted to detect an electrostatic capacity corresponding to the density of the fine material (11) flowing through said transport pipe (1); and,
said density calculating means (51a) is adapted to calculate a density of the fine material (11) flowing through said transport pipe (1) on the basis of the resultant detected value of the electrostatic capacity.

8. The apparatus as claimed in claim 1 or 2, wherein:

said density measuring means (63) comprises a set of
  ultrasonic transmitter (52a) and receiver (53a), and
  a density calculating means (51b);
said set of transmitter (52a) and receiver (53a) are
  installed on the outer surface of said transport pipe
  (1) so as to be opposite to each other with said
  transport pipe (1) in between, said set of transmitter
  (52a) and receiver (53a) are adapted to detect a
  strength of the ultrasonic wave corresponding to
  the density of the fine material (11) flowing
  through said transport pipe (1); and,
said density calculating means (51b) is adapted to
  calculate a density of the fine material (11) flowing
  through said transport pipe (1) on the basis of the
  resultant detected value of the strength of the ultrasonic wave.

9. The apparatus as claimed in claim 1 or 2, wherein:
said density measuring means (63) comprises a set of
  radiation generator (54a) and detector (55a), and a
  density calculating means (51c); said set of generator (54a) and detector (55a) are installed on the
  outer surface of said transport pipe (1) so as to be
  opposite to each other with said transport pipe (1)
  in between, said set of generator (54a) and detector
  (55a) are adapted to detect an amount of the radiation corresponding to the density of the fine material (11) flowing through said transport pipe (1);
  and,
said density calculating means (51c) is adapted to
  calculate a density of the fine material (11) flowing
  through said transport pipe (1) on the basis of the
  resultant detected value of the amount of radiation.

10. The apparatus as claimed in claim 1 or 2, wherein:
said density measuring means (63) comprises a detecting pipe (56), a galvanometer (58) and a density
  calculating means (59);
said detecting pipe (56) is integrally fitted, through
  electric insulators (56a), to said transport pipe (1),
  said detecting pipe (56) has the same inside diameter as that of said transport pipe (1), said detecting
  pipe (56) is adapted to generate a quantity of electricity in said detecting pipe (56), which corresponds to the density of the fine material (11) flowing through said transport pipe (1);
said galvanometer (58) is adapted to detect said quantity of electricity generated in said detecting pipe
  (56); and,
said density calculating means (59) is adapted to calculate a density of the fine material (11) flowing
  through said transport pipe (1) on the basis of the
  resultant detected value of the quantity of electricity.

11. The apparatus as claimed in claim 1 or 2, wherein:
said flow velocity measuring means (64) comprises a
  first pair of electrodes (50a), a second pair of electrodes (50b), and a flow velocity calculating means
  (51'a);
each pair of said first and second pairs of electrodes
  (50a, 50b) are respectively installed on the outer
  surface of said transport pipe (1) at each of two
  points in the axial direction of said transport pipe
  (1) at positions opposite to each other with said
  transport pipe (1) in between so as to cover the
  outer surface of said transport pipe (1), each pair of
  said first and second pairs of electrodes (50a, 50b)
  are adapted to detect an electrostatic capacity corresponding to the density of the fine material (11)
  flowing through said transport pipe (1) at each of
  said two points in the axial direction of said transport pipe (1); and,
said flow velocity calculating means (51'a) is adapted
  to calculate a time lag in detection between the
  pattern of detected values obtained by said first
  pair of electrodes (50a) installed in the upstream of
  said transport pipe (1) and the pattern of detected
  values obtained by said second pair of electrodes
  (50b) installed in the downstream of said transport
  pipe (1), and is adapted to calculate a flow velocity
  of the fine material (11) flowing through said transport pipe (1), on the basis of said time lag in detection thus obtained and the distance (l) between said
  first and second pairs of electrodes (50a, 50b).

12. The apparatus as claimed in claim 1 or 2, wherein:
said flow velocity measuring means (64) comprises a
  first set of ultrasonic transmitter (52a) and receiver
  (53a), a second set of ultrasonic transmitter (52b)
  and receiver (53b), and a flow velocity calculating
  means (51'b);
each set of said first and second sets of transmitters
  and receivers (52a, 53a; 52b, 53b) are respectively
  installed on the outer surface of said transport pipe
  (1) at each of two points in the axial direction of
  said transport pipe (1) so that said transmitter
  (52a or 52b) and said receiver (53a or 53b) are opposite to each other with said transport pipe (1) in
  between, each set of said first and second sets of
  transmitters and receivers (52a, 53a; 52b, 53b) are
  adapted to detect a strength of the ultrasonic wave
  corresponding to the density of the fine material
  (11) flowing through said transport pipe (1) at each
  of said two points in the axial direction of said
  transport pipe (1); and,
said flow velocity calculating means (51'b) is adapted
  to calculate a time lag in detection between the
  pattern of detected values obtained by said first set
  of transmitter (52a) and receiver (53a) installed in
  the upstream of said transport pipe (1) and the
  pattern of detected values obtained by said second
  set of transmitter (52b) and receiver (53b) installed
  in the downstream of said transport pipe (1), and is
  adapted to calculate a flow velocity of the fine
  material (11) flowing through said transport pipe
  (1), on the basis of said time lag in detection thus
  obtained and the distance (l) between said first and
  second sets of transmitters and receivers (52a, 53a;
  52b, 53b).

13. The apparatus as claimed in claim 1 or 2, wherein:
said flow velocity measuring means (64) comprises a
  first set of radiation generator (54a) and detector
  (55a), a second set of radiation generator (54b) and
  detector (55b), and a flow velocity calculating
  means (51'c); each set of said first and second sets of
  generators and detectors (54a, 55a; 54b, 55b) are
  respectively installed on the outer surface of said
  transport pipe (1) at each of two points in the axial
  direction of said transport pipe (1) so that said
  generator (54a or 54b) and said detector (55a or
  55b) are opposite to each other with said transport
  pipe (1) in between, each set of said first and second
  sets of generators and detectors (54a, 55a; 54b, 55b)
  are adapted to detect an amount of the radiation
  corresponding to the density of the fine material
  (11) flowing through said transport pipe (1) at each
  of said two points in the axial direction of said
  transport pipe (1); and, said flow velocity calculating means (51'c) is adapted to calculate a time lag in detection between the pattern of detected values obtained by said first set of generator (54a) and detector (55a) installed in the upstream of said transport pipe (1) and the pattern of detected values obtained by said second set of generator (54b) and detector (55b) installed in the downstream of said transport pipe (1), and is adapted to calculate a flow velocity of the fine material (11) flowing through said transport pipe (1), on the basis of said time lag in detection thus obtained and the distance (l) between said first and second sets of generators and detectors (54a, 55a; 54b, 55b).

14. The apparatus as claimed in claim 1 or 2, wherein: said flow velocity measuring means (64) comprises an ultrasonic transmitter/receiver (60) and a flow velocity calculating means (61);

said transmitter/receiver (60) is installed on the outer surface of said transport pipe (1), said transmitter/receiver (60) is adapted to transmit an ultrasonic wave into said transport pipe (1) so as to angularly intersect with the axial direction of said transport pipe (1) and receive a reflected wave produced by the collision of said ultrasonic wave thus transmitted with the fine material (11) flowing through said transport pipe (1); and, said flow velocity calculating means (61) is adapted to calculate a flow velocity of the fine material (11) flowing through said transport pipe (1), on the basis of the difference in the frequency between the ultrasonic wave transmitted from said transmitter/receiver (60) and the reflected wave received by said transmitter/receiver (60).

15. The apparatus as claimed in claim 1, wherein said first valve (5) is provided in the middle of said first communication pipe (4); and said second valve (9) is provided in the middle of said second communication pipe (8).

16. The apparatus as claimed in claim 2, wherein said manometer (33) is installed in the middle of said second communication pipe (8).

17. The apparatus as claimed in claim 6, wherein said pressure detector 46 is installed in the middle of each of said two measuring pipes (41); and said flow meter (47) and flow control valve (48) are provided in the middle of each of said two measuring pipes (41).

* * * * *